US012805578B2

(12) United States Patent
Kersey et al.

(10) Patent No.: US 12,805,578 B2
(45) Date of Patent: Nov. 24, 2026

(54) AEROSOL PROVISION SYSTEM SECURITY

(71) Applicant: NICOVENTURES TRADING LIMITED, London (GB)

(72) Inventors: Robert Kersey, Brighton (GB); Najeeb Younossi, London (GB); Darryl Baker, London (GB)

(73) Assignee: Nicoventures Trading Limited, London (GB)

( * ) Notice: Subject to any disclaimer, the term of this patent is extended or adjusted under 35 U.S.C. 154(b) by 599 days.

(21) Appl. No.: 18/549,975

(22) PCT Filed: Mar. 10, 2022

(86) PCT No.: PCT/GB2022/050625
§ 371 (c)(1),
(2) Date: Sep. 11, 2023

(87) PCT Pub. No.: WO2022/189796
PCT Pub. Date: Sep. 15, 2022

(65) Prior Publication Data

US 2024/0148077 A1 May 9, 2024

(30) Foreign Application Priority Data

Mar. 12, 2021 (GB) ...................................... 2103483

(51) Int. Cl.
*A24F 40/53* (2020.01)
*A24F 40/65* (2020.01)
(Continued)

(52) U.S. Cl.
CPC .............. *A24F 40/53* (2020.01); *A24F 40/65* (2020.01); *H04L 9/0838* (2013.01); *H04L 9/3271* (2013.01); *A24F 40/60* (2020.01)

(58) Field of Classification Search
CPC .......... A24F 40/53; A24F 40/65; A24F 40/60; A24F 40/49; A24F 40/50; G06F 21/35;
(Continued)

(56) References Cited

U.S. PATENT DOCUMENTS

2020/0054071 A1* 2/2020 Ouyang ............... G06V 40/172
2021/0011446 A1* 1/2021 Anderson ............ G05B 19/042
(Continued)

FOREIGN PATENT DOCUMENTS

JP 2020098392 A 6/2020
JP 2021508457 A 3/2021
(Continued)

OTHER PUBLICATIONS

International Search Report and Written Opinion received for PCT Patent Application No. PCT/GB2022/050625, mailed on Aug. 8, 2022, 18 pages.

(Continued)

*Primary Examiner* — Marcus Hammonds
(74) *Attorney, Agent, or Firm* — Burr & Forman

(57) ABSTRACT

A method for unlocking a non-combustible aerosol provision system involves receiving, from an age verification service, an indication that an age verification process has been successfully completed for the non-combustible aerosol provision system. The method further involves sending an unlock request for the non-combustible aerosol provision system to an unlock service and receiving an unlock password from the unlock service. The unlock password is based on a pass key accessible to the unlock service. The method additionally involves forwarding the unlock password to the non-combustible aerosol provision system for authentication of the unlock password to determine whether the pass key matches a device key at the non-combustible aerosol pro-
(Continued)

vision system. Corresponding devices and computer-readable media are also provided.

13 Claims, 10 Drawing Sheets

(51) Int. Cl.
*H04L 9/08* (2006.01)
*H04L 9/32* (2006.01)
*A24F 40/60* (2020.01)

(58) Field of Classification Search
CPC ........ G06F 21/31; G06F 21/445; G06F 21/46; G06F 21/44; A61M 15/06; H04W 12/06; H04W 12/08; H04W 12/0431; H04L 9/0838; H04L 9/3271; G06Q 20/206; G06Q 20/4014
See application file for complete search history.

(56) References Cited

U.S. PATENT DOCUMENTS

| | | | | |
|---|---|---|---|---|
| 2021/0357600 | A1* | 11/2021 | Sweeney | G06K 19/06037 |
| 2022/0004605 | A1* | 1/2022 | Sweeney | G06F 21/31 |
| 2022/0279860 | A1* | 9/2022 | Stockall | A24F 40/53 |

FOREIGN PATENT DOCUMENTS

| | | | |
|---|---|---|---|
| WO | 2019114597 | A1 | 6/2019 |
| WO | 2019126805 | A1 | 6/2019 |
| WO | 2020006311 | A1 | 1/2020 |
| WO | 2021023533 | A1 | 2/2021 |

OTHER PUBLICATIONS

Invitation to Pay Additional Fees received for PCT Patent Application No. PCT/GB2022/050625, mailed on May 18, 2022, 11 pages.

Notice of Reasons for Refusal from corresponding Japanese Application No. 2025-097563, mailed Mar. 3, 2026, all pages cited in its entirety.

* cited by examiner

AEROSOL PROVISION SYSTEM SECURITY

PRIORITY CLAIM

The present application is a National Phase entry of PCT Application No. PCT/EP2022/050625, filed Mar. 10, 2022, which claims priority from GB Application No. 2103483.0, filed Mar. 12, 2021, each of which is hereby fully incorporated herein by reference.

TECHNICAL FIELD

The present disclosure relates to the field of security for an aerosol provision system. In particular, but not exclusively, the present disclosure relates to locking and unlocking a non-combustible aerosol provision system.

BACKGROUND

A "non-combustible" aerosol provision system is an aerosol provision system where a constituent aerosol-generating material of the aerosol provision system (or component thereof) is not combusted or burned in order to facilitate delivery of at least one substance to a user.

The non-combustible aerosol provision system may be an electronic cigarette, also known as a vaping device or electronic nicotine delivery system (END), although it is noted that the presence of nicotine in the aerosol-generating material is not a requirement.

The non-combustible aerosol provision system may be an aerosol-generating material heating system, also known as a heat-not-burn system. An example of such a system is a tobacco heating system.

The non-combustible aerosol provision system may be a hybrid system to generate aerosol using a combination of aerosol-generating materials, one or a plurality of which may be heated. Each of the aerosol-generating materials may be, for example, in the form of a solid, liquid or gel and may or may not contain nicotine. The hybrid system may comprise a liquid or gel aerosol-generating material and a solid aerosol-generating material. The solid aerosol-generating material may comprise, for example, tobacco or a non-tobacco product.

Typically, the non-combustible aerosol provision system may comprise a non-combustible aerosol provision device and a consumable for use with the non-combustible aerosol provision device.

The non-combustible aerosol provision system, such as a non-combustible aerosol provision device thereof, may comprise a power source and a controller. The power source may, for example, be an electric power source or an exothermic power source. The exothermic power source comprises a carbon substrate which may be energized so as to distribute power in the form of heat to an aerosol-generating material or to a heat transfer material in proximity to the exothermic power source.

The non-combustible aerosol provision system may comprise an area for receiving the consumable, an aerosol generator, an aerosol generation area, a housing, a mouthpiece, a filter and/or an aerosol-modifying agent.

The consumable for use with the non-combustible aerosol provision device may comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

SUMMARY

Viewed from a first aspect, there is provided a method for unlocking a non-combustible aerosol provision system, the method comprising: receiving, from an age verification service, an indication that an age verification process has been successfully completed for the non-combustible aerosol provision system; sending an unlock request for the non-combustible aerosol provision system to an unlock service; receiving an unlock password from the unlock service, the unlock password based on a pass key accessible to the unlock service; and forwarding the unlock password to the non-combustible aerosol provision system for authentication of the unlock password to determine whether the pass key matches a device key at the non-combustible aerosol provision system.

Therefore, since verifying the age of a user at the aerosol provision system itself may not be practical due to the small size and potentially limited processing power of the system, a separate age verification service is used to verify the age of the user. The non-combustible aerosol provision system is configured to remain in a locked state in which the system prevents the generation and delivery of aerosols until the system is able to confirm that the age verification process has been successfully carried out. A mathematically secure means for communicating that age verification has been successfully been performed is provided by making use of cryptographic techniques, thereby reducing the chance that an in appropriate user (e.g., someone trying to unlock device without validly verifying their age) could generate a message that would inappropriately trigger an unlock of the system.

Various optional features which may be implemented in combination with the first aspect described above may provide additional protection against replay attacks which a validly generated unlock password is used with an aerosol provision system for which it was not intended, at a later time than was intended, or otherwise outside the scope for which the message was generated by the unlock service. Optional features which may be implemented also provide additional protection to reduce the impact on further aerosol provision systems if one non-combustible aerosol provision system is compromised and/or additional mitigation against the possibility of a user inappropriately triggering an unlock despite not having performed age verification.

Viewed from a second aspect, there is provided a device for unlocking a non-combustible aerosol provision system, the device comprising processing circuitry configured to: receive, from an age verification service, an indication that an age verification process has been successfully completed for the non-combustible aerosol provision system; send an unlock request for the non-combustible aerosol provision system to an unlock service; receive an unlock password from the unlock service, the unlock password based on a pass key accessible to the unlock service; forward the unlock password to the non-combustible aerosol provision system for authentication of the unlock password to determine whether the pass key matches a device key at the non-combustible aerosol provision system.

Viewed from a third aspect, there is provided a computer-readable medium corresponding to the method and device of the first and second aspects.

Viewed from a fourth aspect, there is provided a method for unlocking a non-combustible aerosol provision system, the method comprising: receiving, at the non-combustible aerosol provision system from a user device, an unlock password, the unlock password based on a pass key; generating a test password based on a device key stored on the non-combustible aerosol provision system; comparing the test password and the unlock password to determine whether the device key matches the pass key on which the unlock password is based; and in response to detecting a match in the comparison, unlocking the non-combustible aerosol provision system.

Viewed from a fifth aspect, there is provided a non-combustible aerosol provision system comprising processing circuitry configured to: receive an unlock password from a user device, the unlock password based on a pass key; generate a test password based on a device key stored on the non-combustible aerosol provision system; compare the test password and the unlock password to determine whether the device key matches the pass key on which the unlock password is based; and unlock, in response to detecting a match in the comparison, the non-combustible aerosol provision system.

Viewed from a sixth aspect, there is provided a computer-readable medium corresponding to the method and non-combustible aerosol provision system of the fourth and fifth aspects.

Viewed from a seventh aspect, there is provided a method for unlocking a non-combustible aerosol provision system, the method comprising: receiving, by a user device from an age verification service, an indication that an age verification process has been successfully completed for the non-combustible aerosol provision system; sending by the user device, an unlock request for the non-combustible aerosol provision system to an unlock service; generating, by the unlock service, an unlock password based on a pass key accessible to the unlock service; sending, by the unlock service to the user device, the unlock password; forwarding, by the user device to the non-combustible aerosol provision system, the unlock password; generating, by the non-combustible aerosol provision system, a test password based on a device key stored on the non-combustible aerosol provision system; comparing the test password and the unlock password to determine whether the device key matches the pass key on which the unlock password is based; and in response to detecting a match in the comparison, unlocking the non-combustible aerosol provision system.

Viewed from an eighth aspect, there is provided a system comprising: a non-combustible aerosol provision system; a remote device; and an unlock service; wherein: the remote device is configured to receive from an age verification service, an indication that an age verification process has been successfully completed for the non-combustible aerosol provision system, and to send an unlock request for the non-combustible aerosol provision system to an unlock service; the unlock service is configured to generate an unlock password based on a pass key accessible to the unlock service, and send the unlock password to the remote device; the remote device is further configured to forward the unlock password to the non-combustible aerosol provision system; and the non-combustible aerosol provision system is configured to generate a test password based on a device key stored on the non-combustible aerosol provision system, compare the test password and the unlock password to determine whether the device key matches the pass key on which the unlock password is based, and in response to detecting a match in the comparison, unlock the non-combustible aerosol provision system.

Viewed from a ninth aspect, there is provided a computer-readable medium corresponding to the method and system of the seventh and eighth aspects.

Viewed from a tenth aspect, there is provided a method for provisioning a non-combustible aerosol provision system with a cryptographic key, the method comprising: receiving a device identifier for the non-combustible aerosol provision system; obtaining a particular cryptographic key to provision to the non-combustible aerosol provision system based on one or more cryptographic keys provided by a key generation service; causing the device identifier to be stored in association with the particular cryptographic key; and writing the particular cryptographic key to the non-combustible aerosol provision system.

Therefore, a secure means for generating unique keys and providing them to the computing device to provision to the aerosol provision systems is provided. Various optional features which may be implemented in combination with the tenth aspect described above may allow the keys to be provisioned by an offline computing device operating without data connectivity.

Viewed from an eleventh aspect, there is provided a system for provisioning a non-combustible aerosol provision system with a cryptographic key, the system comprising: the non-combustible aerosol provision system; a computing device configured to: receive a device identifier for the non-combustible aerosol provision system; obtain a particular cryptographic key to provision to the non-combustible aerosol provision system based on one or more cryptographic keys provided by a key generation service; cause the device identifier to be stored in association with the particular cryptographic key; and write the particular cryptographic key to the non-combustible aerosol provision system.

Viewed from a twelfth aspect, there is provided a computer-readable medium corresponding to the method and computing of the tenth and eleventh aspects.

BRIEF DESCRIPTION OF THE DRAWINGS

Embodiments and examples of the present approaches will now be described, by way of example only, with reference to the accompanying drawings, in which.

Figure 1:
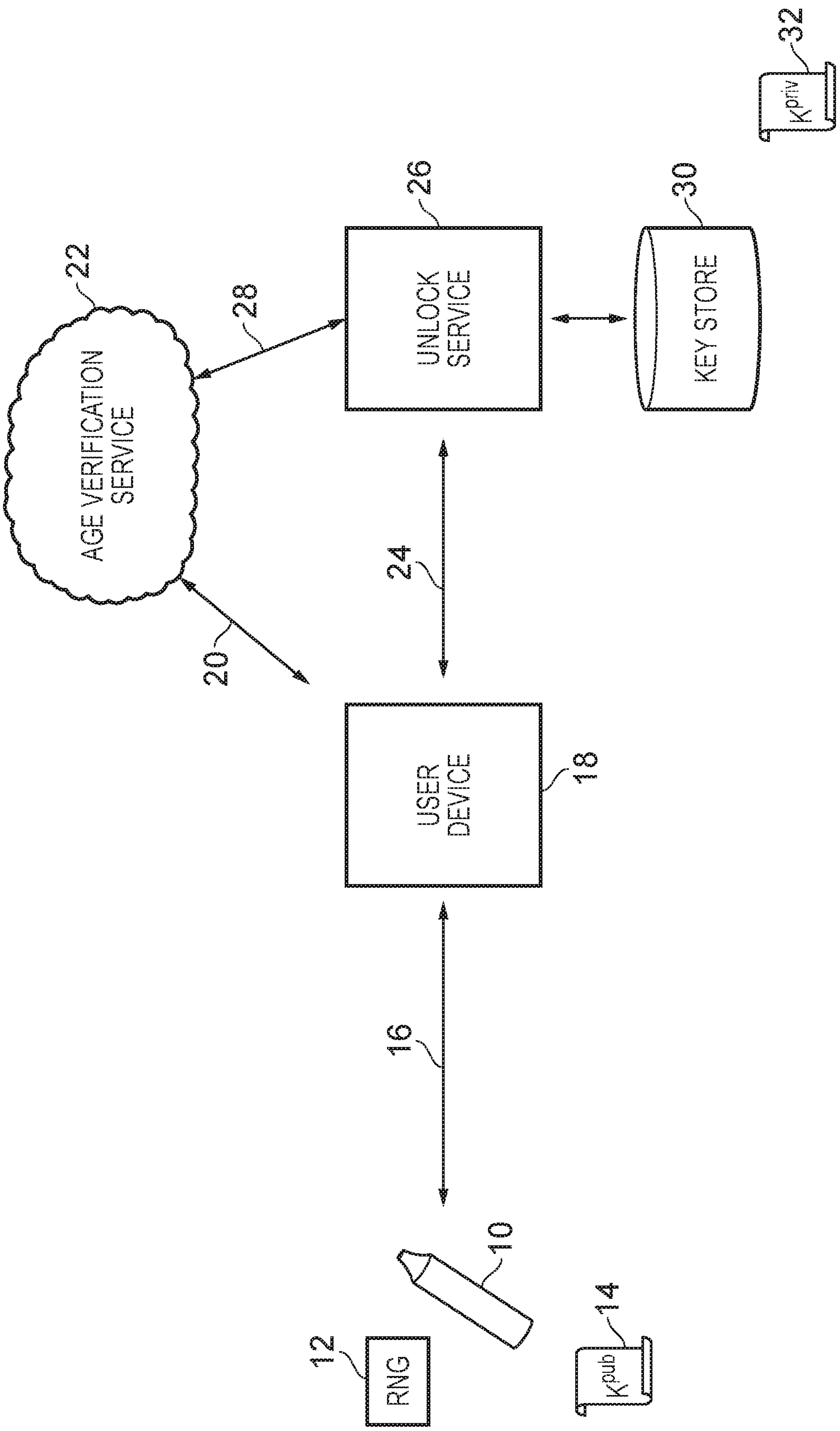
FIG. 1 is a schematic illustrating an example in which asymmetric key cryptography is implemented to unlock a non-combustible aerosol provision system.

While the presently described approach is susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope as defined by the appended claims.

DETAILED DESCRIPTION

In the context of non-combustible aerosol provision systems, it may be appropriate to ensure that use is restricted to people above a certain age. Since verifying the age of a user at the non-combustible aerosol provision system itself may not be practical due to the small size and potentially limited processing power of the system, in accordance with the techniques described herein, a separate user device is used to interact with an age verification service to verify the age of the user. The non-combustible aerosol provision system is configured to remain in a locked state in which the system prevents the generation and delivery of aerosols until the system is able to confirm that the age verification process has been successfully carried out.

The age verification process itself may take any suitable form, but in some examples, the age verification process involves submitting a photo of the user and an identity document of the user indicating the user's age, which can be checked to verify that the user is the required age before unlocking the non-combustible aerosol provision system. Other age verification approaches are possible, and any age verification process which can be implemented using an age verification service can be used with the presently disclosed techniques. The age verification service carrying out the age verification process may be implemented by the manufacturer and/or supplier of the non-combustible aerosol provision system, or may be implemented by a third party age verification service provider.

Such an age verification service is provided from a location remote from the non-combustible aerosol provision system. Thus the following teachings will explain approaches for securely determining that a given age verification result is applied to the non-combustible aerosol provision system for which it was intended. Thus the present approaches may provide for a particular non-combustible aerosol provision system to be unlocked in response to successful age verification of a user/owner of that non-combustible aerosol provision system, while avoiding the same age verification being applied to a non-combustible aerosol provision system of a different user/owner. As such, these techniques can help prevent unauthorized access to the system, for example by underage users.

The present examples make use of cryptographic techniques to securely indicate to the non-combustible aerosol provision system that the age verification process has been successfully carried out and that the system should be unlocked. In response to notification that the ager verification process has been completed, the system permits the user to use the system to generate aerosols. By making use of cryptography, the present examples provide a mathematically secure means for communicating that age verification has been successfully been performed, reducing the chance that a non-verified user could generate a message that would inappropriately trigger an unlock of the system.

Approaches of the present teachings make use of each of public key cryptography (also known as asymmetric cryptography) and symmetric cryptography (also known as secret key cryptography). The over-arching approach which is applied regardless of which cryptography technique is adopted provides that a non-combustible aerosol provision system may be unlocked by use of a method that includes: receiving from an age verification service, an indication that an age verification process has been successfully completed in relation to a user of the non-combustible aerosol provision system; sending an unlock request for the non-combustible aerosol provision system to an unlock service; receiving an unlock message from the unlock service, the unlock message being cryptographically associated with a cryptographic key stored at the non-combustible aerosol provision system; and forwarding the unlock message to the non-combustible aerosol provision system for authentication of the unlock message is genuine using the cryptographic key stored at the non-combustible aerosol provision system.

Herein the term "user" is used to denote the person to be verified by the age verification service in order to unlock a non-combustible aerosol provision system. It will be understood that the user may or may not be the owner of the non-combustible aerosol provision system but will be the person associated with a user device which is used to communicate locally with the non-combustible aerosol provision system for which unlocking is requested. The user may also be registered to or associated with the non-combustible aerosol provision system in some form of manufacturer or supplier record with which the user device can communicate.

The non-combustible aerosol provision system for which unlocking is requested is already in a locked state. This locked state may be a default state in which the device was configured at the time of sale, and/or may be a state which is adopted if the device becomes disassociated from a user device via which age verification has previously been provided. Such dissociation may relate to becoming associated with a different user device and/or may relate to passage of a threshold time duration since connectivity to the user device has been established. Thus not only may age verification for unlocking (as described below) be required before use of the non-combustible aerosol provision system after purchase, a successful age verification for unlocking may also need to be re-performed periodically, after a period of disconnection from an associated user device or upon association with a different user device.

While the following description provides detail of the implementation approaches for the two cryptography techniques, it will be understood that both techniques are linked by this general approach. In addition, it will be appreciated that optional features and techniques applied in relation to the first approach may also be applied in relation to the second approach and optional features and techniques applied in relation to the second approach may also be applied in relation to the first approach.

As mentioned above, a user device is used in the described techniques for unlocking the non-combustible aerosol provision system. The user device (which may also be termed a remote device, in the sense that the device is remote from the non-combustible aerosol provision system, or intermediary device, in the sense that the device is intermediate between the non-combustible aerosol provision system and the unlock/age verification services) is configured to be able to establish a local communication channel with the non-combustible aerosol provision system. The local communication channel may take a number of forms as discussed below. The user device is also configured to establish a communication channel with either or both of the age verification service and an unlock service, in order to send and receive messaging to provide for unlocking of the non-combustible aerosol provision system. The user device may for example be a mobile phone or tablet device of the user. By using a user device in this way to facilitate communication between the aerosol provision system and the unlock service, the method reduces the processing requirements of the aerosol provision system, thereby allowing aerosol provision systems with limited connectivity and processing power to be locked and unlocked securely.

Figure 2A:
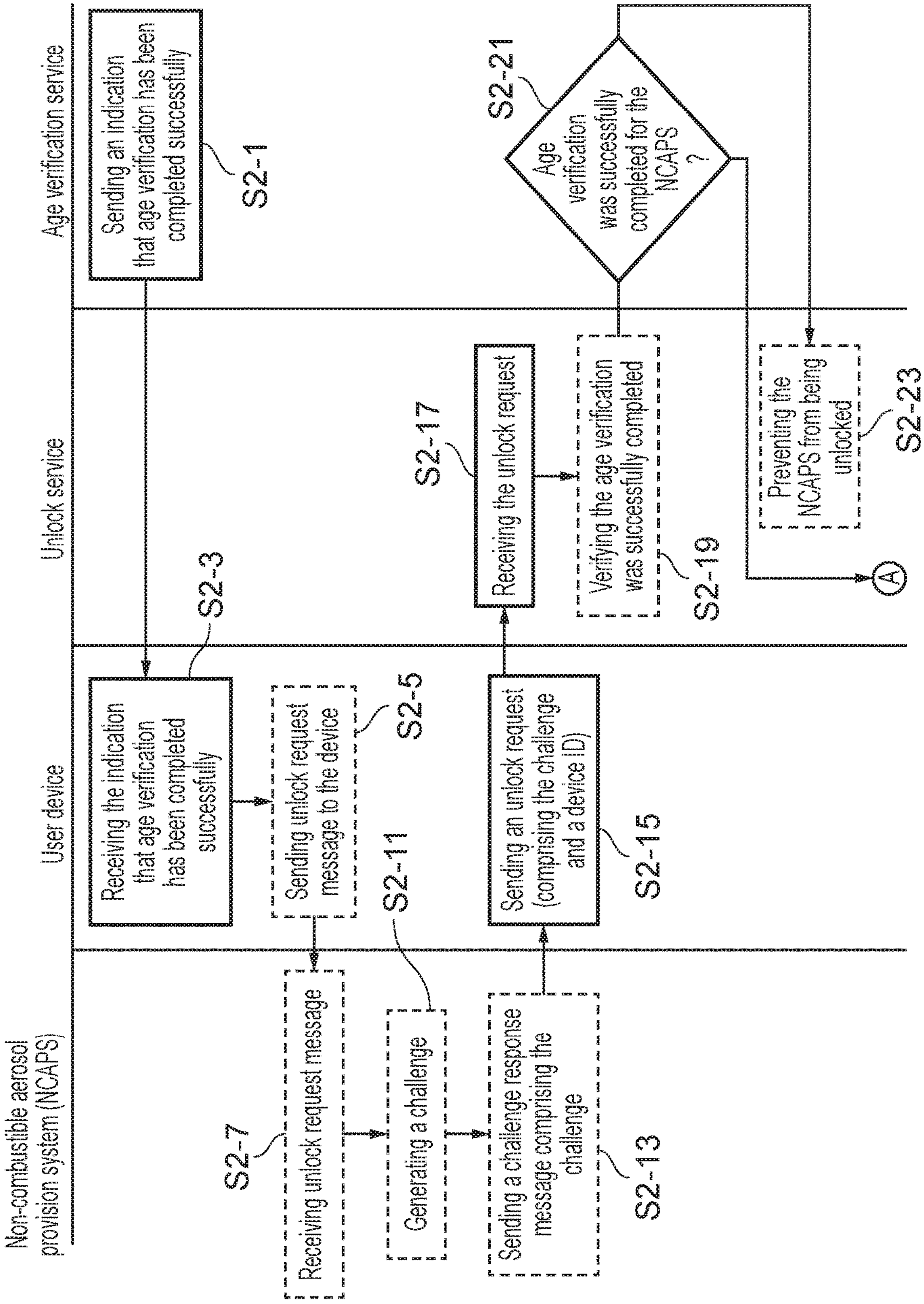
FIGS. 2A-2B are a flow diagram illustrating a method for unlocking a non-combustible aerosol provision system using asymmetric key cryptography.
Figure 2B:
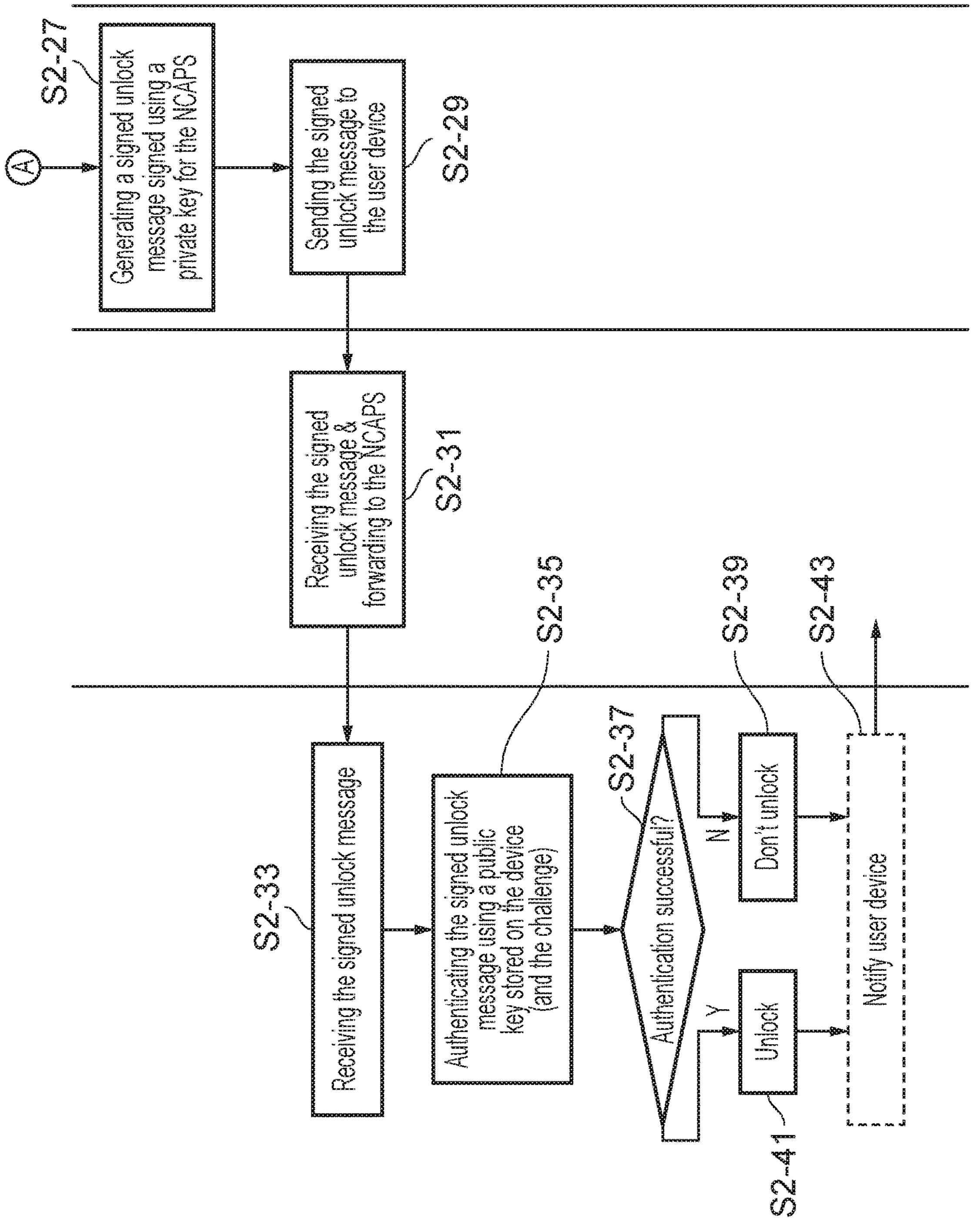

A first set of examples in which asymmetric key cryptography is implemented to unlock a non-combustible aerosol provision system are illustrated with reference to FIGS. 1, 2A and 2B. A schematic infrastructure for these examples is shown in FIG. 1. As shown in this Figure, a non-combustible aerosol provision system 10 includes a random number generator 12 and a public key 14. These are used to generate the messaging for the unlock process, as is described further below.

As also show, the non-combustible aerosol provision system 10 is connected to a user device 18 by a local communication channel 16. The local communication channel may be impermanent or otherwise transient in the sense that the channel may be established for a period of time necessary to carry out specific functionalities, but may also be disconnected when not required.

In the present example, the local communication channel 16 is a wireless channel provided using a connectivity technology such as a personal area network protocol. Example personal area network protocols include Bluetooth™, Bluetooth Low Energy™ (BLE), Zigbee™, Wireless USB, and Near-Field Communication (NFC). Example personal area network protocols also include protocols making use of optical communication such as Infrared Data association (IrDA) and data-over-sound The remainder of this discussion will use the example of BLE and will use BLE terminology, although it will be appreciated that corresponding or equivalent functionalities of other personal area network technologies may be substituted. Other wireless technologies such as a Wi-Fi™ technology may be used if the non-combustible aerosol provision system has suitable capability. In other examples, the local communication channel 16 may be a wired communication channel provided between physical ports of the non-combustible aerosol provision system 10 and the user device 18. Such a wired communication channel may utilize a physical connection technology such as USB™, a serial port, FireWire™ or other point-to-point wired connectivity.

Using the local communication channel 16, the user device 18 and non-combustible aerosol provision system 10 may exchange messaging relating to use of the non-combustible aerosol provision system 10. This messaging may include a number of different functionalities, and the present disclosure will focus on those relating to unlocking of the non-combustible aerosol provision system 10 for use after successful age verification.

To provide the functionalities at the user device 18, the present approaches use a software application (often referred to simply as an "app") for carrying out the unlock functionality. As will be appreciated, the app may include other functionalities relating to use of the non-combustible aerosol provision system 10. These may include tasks such as providing a mechanism for a user to view details of their usage of the non-combustible aerosol provision system 10. The present disclosure will focus on the functionality relating to unlocking of the non-combustible aerosol provision system 10 for use after successful age verification.

The user device 18 is, as shown, also connectable to an age verification service 22 by a network connection 20. The age verification service 22 may be a commercial age verification service that uses known approaches for establishing that a person for verification is or is not over a certain age threshold. In the present context, the age verification service 22 is able to provide an age verification pass/fail result (or an output usable to represent an age verification pass/fail result, such as an actual age number which can be tested against an age threshold) in response to a request for age verification which identifies the user in a suitable manner. The nature of the suitable manner may vary between different age verification services, and may include one or more of a user name, a user identify number, a user photograph, a user identification document or other personal identifying information of the user. Interaction between the user device 18 and the age verification service 22 may utilize a publicly exposed interface of the age verification service such as an application programming interface. One example of a commercially available age verification service is Jumio™ which provides an API for use in submitting verification requests.

The connectivity between the user device 18 and the age verification service 22 is described as being a network connection 20 to facilitate use of a commercial age verification service with an internet-accessible interface. Thus the network connection 20 may include one or more of local area network, wide area network and internet connectivities, which may be provided over wireless and/or wired network infrastructure. The connectivity may be intermitted or impermanent in that the connection may be established for conduct of specific functionalities but not otherwise necessarily maintained. To provide that a given age verification request and response are securely exchanged without opportunity for fraudulent intervention by a malicious party, the network connection 20 may be secured by a technique such as SSL, tunnelling, encryption, signed messaging or the like.

The user device 18 is, as shown, also connectable to an unlock service 26 via a network connection 24. The unlock service 26 has a key store 30, which stores a private key 32. The private key 32 as stored in the key store of the unlock service and the public key 14 as stored at the non-combustible aerosol provision system are a corresponding public/private key pair. The key store 30 may be inherent or internal to the unlock service 26, or alternatively the key store 26 may be external to but securely connected to the unlock service 26. The unlock service 26 is able to receive an unlock request which has been generated using the public key 14 at the non-combustible aerosol provision system 10, test that unlock request against the private key 32 and responsively generate an unlock message using the private key 32 that can subsequently be tested against the corresponding public key 14 to facilitate unlocking.

The unlock service 26 is also able to utilize an age verification result for the user of the non-combustible aerosol provision system 10 to trigger provision of the responsively generated unlock message. In the present example, the age verification result is provided direct from the age verification service 22 to the unlock service 26 via a network connection 30. In other examples, the age verification result may be provided from the age verification service 22 to the unlock service 26 via the user device 18 (and hence via network connections 20 and 24).

Thus the unlock service 26 of the present example stores an association between the non-combustible aerosol provision system 10 and the private key 32. The unlock service 26 may also store the received age verification result in association with the non-combustible aerosol provision system 10 and the private key 32. The unlock service 26 may also or alternatively store an identifier corresponding to the user and/or the user device (or an instance of an app on the user device) in association with the private key 32.

Interaction between the user device 18 and the unlock service 26 (and also any interactions between the unlock service 26 and age verification service 22) may utilize a publicly exposed interface of the unlock service 26 such as an application programming interface. An application programming interface is a programmatic interface that provides for requests and messages to be provided using a pre-defined format or rules that facilitate secure and correct operation of the service.

The connectivity between the user device 18 and the unlock service 26 (and also any interactions between the unlock service 26 and the age verification service 22) is described as being a network connection 24 (and 28) to facilitate the unlock service being provided at a remote location to the user device using a remotely-accessible interface (which may be an API interface as mentioned above). Thus the network connection 26 (and 28) may include one or more of local area network, wide area network and internet connectivities, which may be provided over wireless and/or wired network infrastructure. The connectivity may be intermitted or impermanent in that the connection may be established for conduct of specific functionalities but not otherwise necessarily maintained. To provide that given unlock requests and unlock messages (and age verification results) are securely exchanged without opportunity for fraudulent intervention by a malicious party, the network connection 24 (and 28) may be secured by a technique such as SSL, tunnelling, encryption, signed messaging or the like.

Thus there has been described an overview of an infrastructure that provides for a non-combustible aerosol provision system in a locked state to be securely unlocked upon request and in dependence upon the outcome of an age verification test for the user of the non-combustible aerosol provision system.

The method unlocking a non-combustible aerosol provision system using asymmetric key cryptography executed by the infrastructure illustrated with reference to FIG. 1 will now be discussed with respect to FIGS. 2A-2B. In this example, all operations shown in FIGS. 2A-2B are employed. However, the boxes with dashed lines in FIGS. 2A-2B indicate some operations that may be omitted from the method in other examples.

In the present examples, the process may be triggered in one of a number of ways. The consistent facets of the triggering are that a user wishes to unlock a non-combustible aerosol provision system for use, and that an age verification is required for the unlocking to be achieved. In a first example, a user submits a request to unlock the aerosol provision system at the user device, which then directs the user to the age verification service in order to verify their age before the aerosol provision system can be unlocked. In another example, the user may attempt to activate the non-combustible aerosol provision system in its locked state, which may signal to the user device to notify the user to commence the age verification and unlocking process. In a further example the user may interact directly with the age verification service with the age verification service later notifying the user device (either directly or via the unlock service) that the age of the user was successfully verified.

Irrespective of how the age verification process was triggered, as illustrated at S2-1, once the age verification process has been successfully completed, the age verification service 22 sends an indication that the age verification process was successfully completed to the user device 18 via the connection 20. As mentioned above, this indication of successful completion may be a simple pass (as distinct from fail) result, or may alternatively be an indication of for example an actual age result which the user device can then test against a locally-stored threshold.

Accordingly, at S2-3 the user device 18 receives an indication from the age verification service that the process has been successfully completed. This indication alerts or notifies the user device 18 that the unlocking process can commence. As mentioned above, the user device 18 may run an app (or any other suitable form of software) to allow the user to control the aerosol provision system and the indication may be received in the app. Additionally or alternatively, as mentioned above the indication may be in accordance with an API governing the form and content of the interactions between the user device 18 (or the app thereof) and the age verification service 22. In some examples however, the indication from the age verification service may be in the form of an email or text message sent to the user device, or the indication may be provided via the user themself (e.g., the age verification service providing the user with a code to indicate that age verification has been completed).

In response to the indication that age verification was completed, the user device will then produce or procure an unlock request for sending to the unlock service. As illustrated, the unlock request in the present example is procured by the user device sending (S2-5) an unlock request to the non-combustible aerosol provision system 10. The unlock request (which may also be termed a challenge request) is then received at the non-combustible aerosol provision system 10 at S2-7.

Responsive to the unlock request, the non-combustible aerosol provision system 10 generates a challenge at S2-11. The challenge can take a number of forms. As described below, the various described approaches for generating the challenge can provide protection against so-called replay attacks. In some examples, the challenge may be considered as being a cryptographic nonce (or number-used-once).

In general, a more complex challenge may be used to reduce the likelihood that the challenge will be unique to the non-combustible aerosol provision device generating the message, the time at which the aerosol provision device generates the message, or both. This reduces the likelihood that the challenge and thus a responsive unlock message could be accidentally or deliberately re-used for multiple different unlock requests against multiple non-combustible aerosol provision systems.

On the other hand, by providing a challenge response message that can be easily generated by the non-combustible aerosol provision system, the non-combustible aerosol provision system may be able to generate the challenge more quickly and without the need for more complicated processing circuitry.

In the present example, the challenge is created generating a random number using random number generator 12 of the non-combustible aerosol provision system 10. As used herein, the term random number refers to both truly random numbers and pseudo-random numbers. This approach may provide for the challenge to have low predictability as well as providing an increased chance that a different challenge will be generated by the same non-combustible aerosol provision system 10 at different times.

In the present example, the random number is then hashed to create a hash digest of the random number. By using a hash approach, the challenge may benefit from the uniqueness of a long random number without the exchanged messages needing to be equally long, also as will become apparent below this also provides that the length of data upon which the non-combustible aerosol provision system needs to perform any cryptographic operation can be minimized. The hash may be computed using any suitable hash algorithm such as a Secure Hash Algorithm. The present example uses an SHA-2 algorithm to provide an appropriate balance between security and processing effort required of the non-combustible aerosol provision system, although other algorithms can be used. One specific illustrative example uses the SHA256 variant of SHA-2 to generate the hash digest, which digest is then expressed in Base64 for ease of copying.

Although the above-described example uses the random number itself for generating in the challenge response message, in some examples, the random number is used to select one of a plurality of predetermined challenge content to be used as the challenge content.

Although the above-described example uses a hash of the random number to generate the challenge, in some examples the random number itself (or a sub-part thereof) may be used as the challenge.

In a more simplified example that avoids the need for a number generation at the non-combustible aerosol provision system, the challenge comprises a device identifier or serial number of the device. In this way, the challenge response message can be easily generated without the need for complicated processing circuitry. Further, since the device identifier will likely be unique to the aerosol provision system, it is known that the challenge response message will not be the same as a challenge response message generated by another aerosol provision device. Such a device identifier or serial number may additionally be used in combination with the random number approach discussed above.

In some examples, the challenge may also include a timestamp to link the challenge to the time at which it was generated. This may be done to provide a challenge that is likely to be unique in the sense that the particular aerosol provision system as well as other aerosol provision systems will not generate the same challenge including the same timestamp.

Once the challenge has been generated at S2-11, the challenge is sent from the non-combustible aerosol provision system 10 to the user device 18 as a challenge response message at S2-13, which may also be termed notifying the challenge. The user device 18 then incorporates the challenge response message into an unlock request for sending to the unlock service 26 (at S2-15), which may also be termed posting the challenge. The unlock request message of the present example includes information identifying at least one of the non-combustible aerosol provision system 10, the user, and/or user device 18. As discussed above, the unlock request message is sent from the user device 18 to the unlock service 26 over connection 24, and in accordance with communication or interaction rules defined for such communication, such as an API. This unlock request message is then received by the unlock service 26 at S2-17.

As discussed above, the unlock service may take a number of forms. In the present example, the unlock service is implemented as a remote service accessible to the user device via the internet. In some examples, the unlock service is provided by a cloud which may be a public cloud or a private cloud maintained by the manufacturer of the aerosol provision device for example.

Receipt of the unlock request by the unlock service triggers the unlock service to generate a signed unlock message which can be used to unlock the aerosol provision system. As mentioned above, in accordance with the techniques of the present examples, public key cryptography (also known as asymmetric cryptography) is used so that only the unlock service is able to unlock the aerosol provision system. With public key cryptography, a pair of keys comprising a public key and a private key is used. One of the public/private keys can be used to perform a cryptographic operation on some data to encrypt that data such that the data itself is obscured. The other of the public/private keys can then be used to reverse the cryptographic operation in order to decrypt the encrypted data. In the examples which utilize asymmetric cryptography, the public key 14 resides at the non-combustible aerosol provision system and the private key resides at the key store 30 of the unlock service 26.

In the present example, the challenge (as provided to the unlock service 26) in the unlock request message that itself is based upon the challenge response message is signed using the private key 32 to generate the signed unlock message (which may also be termed a signed challenge response). As mentioned above, the present example also involves direct provision of the age verification outcome from the age verification service 22 to the unlock service 26.

Thus, prior to generating the signed unlock message, the unlock service 26 verifies the age verification result against the age verification service 22. In the present example, at S2-19 the unlock service sends a verification request to the age verification service 22 using connection 28, the verification request asking for confirmation that an age verification process has already been successfully completed for the non-combustible aerosol provision system 10. To facilitate this verification request, unlock service 26 utilizes the information describing the non-combustible aerosol provision system 10, the user, and/or the user device 18 from the unlock request message to identify to the age verification service 22 the age verification result of which confirmation is sought.

Thus, as illustrated at S2-21, the age verification service 22 receives the request for confirmation that an age verification process has already been successfully completed for the non-combustible aerosol provision system 10, and checks whether this is the case. In the event that no age verification process has been successfully completed (NO output from S2-21) the unlock service is informed of this fact and the unlock process terminates at S2-23. It is possible at this point for the unlock service 22 to notify the user device 18 that the unlock process has been terminated, which may for example prompt a user to re-attempt age verification. As will be understood the termination of the unlock process at this point in the process prevents unlocking of the non-combustible aerosol provision system 10 as no unlock instruction is then sent to the user device 18 or the non-combustible aerosol provision system 10. On the other hand, in the event that age verification process has in fact been successfully completed (YES output from S2-21) the unlock service is informed of this fact and the unlock process continues at S2-27.

As an alternative or modified approach, in the example mentioned above, in which the age verification service provided a result direct to a user by way of a code provided direct to the user, the unlock request message can also include this code, which code the unlock service can either user as inherent evidence of the age verification being passed, or can use as part of a request to the age verification service to confirm that age verification has been completed.

In other examples, the age verification result may have been already provided to the unlock service 26 by the age verification service 22 at the same time that the same result was provided to the user or user device when the age verification process was conducted. In such an example, the age verification result will have included some indication of the non-combustible aerosol provision device, user or user device in respect of which the age verification was provided, such as to permit the unlock service 26 to later match the age verification result to the unlock request message received from the user device 18 in relation to the non-combustible aerosol provision system 10. In such examples, matching the age verification result to the unlock request message will occur between S2-17 and S2-27 (or S2-23 if such a match cannot be found).

In other examples, where the age verification result is not provided direct from the age verification service 22 to the unlock service 26, the unlock request message may have included a representation that the age verification has completed successfully. Such result may then be used by the unlock service 26 to progress directly from S2-17 to S2-27. In such examples, the representation that the age verification has completed successfully included in the unlock request message may itself be securely indicated as genuine, such as to impede a malicious entity from achieving an unlock of the non-combustible aerosol provision system 10 by compromising the user device 18 or issuing a faked age verification result to the user device for inclusion in the unlock request message. For example the representation that the age verification has completed successfully could have been signed using a private key of the age verification service 22, which signature can then be verified by the unlock service 26 using a corresponding public key of the age verification service.

These approaches of testing, checking or otherwise confirming the age verification result mitigate against the possibility of a user inappropriately triggering an unlock request despite not having performed age verification which would have led to the indication being sent from the age verification service that the age of the user had been satisfactorily verified. By performing an independent verification with the age verification service in this way, even an erroneously-generated unlock request can be prevented from initiating an unlock of the non-combustible aerosol provision system.

Thus the approach continues at S2-27 at which the unlock service 26 generates a signed unlock message which is signed using the private key 32.

In the present example this signed unlock message is generated by the unlock service 26 signing the challenge as originally generated at the non-combustible aerosol provision system 10 and then forwarded to the unlock service by way of the challenge response message and unlock request message. As described above, the challenge of the present example was created by generating a hash of the random number generated at the non-combustible aerosol provision system 10. Thus the signed unlock message is created by signing that hash digest with the private key 32. As will be appreciated, such a signature can then later be verified by the public key 14 at the non-combustible aerosol provision system 10. As described further below, this would enable the signature to be tested against the original challenge, which would provide verification that the unlock process has not been tampered with "in flight" during either of the journey to or from the unlock service 26.

In the specific example in which the hash digest was expressed into Base 64 before sending in the challenge response message, the unlock service 26 may decode the hash digest from the Base64 encoding, then sign the hash digest, and then encode the signed hash digest back into Base64.

In some alternative examples, the unlock service 26 generates the signed unlock message by first generating an unsigned unlock message, then performing a cryptographic operation on a hash of the unsigned unlock message using the private key to form a signature. In such examples, the signed unlock message comprises both the signed unlock message and the signature. This signed unlock message can later be authenticated by the non-combustible aerosol provision system 10 to verify that the signed unlock message was generated by someone in possession of the private key (i.e. the unlock service) by using the public key to undo the cryptographic operation on the signature and comparing this with a hash of the unsigned unlock message. If these match, this provides a strong indication that the signed unlock message was generated by the unlock service and has not been tampered with 'in-flight' between the unlock service and the aerosol provision system.

Another approach to generating the signed unlock message involves performing the cryptographic operation using the private key directly on the unsigned unlock message to generate an encrypted version of the unsigned unlock message as the signed unlock message. In such a case, the signed unlock message can be authenticated by the aerosol provision system (or indeed by anyone with the public key) by undoing the cryptographic operation using the public key to reveal the unsigned unlock message. If the unsigned unlock message is still an unlock message in accordance with an agreed format, the aerosol provision system may determine that the unlock message is valid.

Having generated the signed unlock message at S2-27, the unlock service 26 sends the signed unlock message to the user device 18 at S2-29. In turn, the user device 18 receives the signed unlock message and forwards the signed unlock message to the non-combustible aerosol provision system 10 at S2-31.

In response to receiving (at S2-33) the signed unlock message forwarded by the user device 18, the aerosol provision system authenticates at S2-35 the signed unlock message using the public key stored at the aerosol provision system to determine whether the private key 32 used to sign the unlock message corresponds to the public key 14 at the non-combustible aerosol provision system.

As described above, this authentication could be carried out by hashing an unsigned copy of the unlock message included within the signed unlock, using the public key 14 to undo the cryptographic operation performed on the signature and comparing the results. Alternatively, the authenticating may involve decrypting the signed unlock message using the public key 14 and determining whether the resulting message is a valid unlock message.

As prefaced above, the present example uses as the signed unlock message a signed copy of the hash digest that was created as the challenge and sent in the challenge response message. Thus, verification of the signed unlock message at the non-combustible aerosol provision device 10 in the present example comprises verifying that the signature applied to the hash digest could only have been created using the private key 32 that is the pair of the public key 14, and that the signature was applied to the hash digest that formed the challenge. In the specific example in which the signed unlock message was converted to Base64 for transmission, the authenticating will include reversing the Base64 encoding prior to the verification using the public key 14.

Successful authentication by the non-combustible aerosol provision system 10 therefore provides a strong indication both that the signed unlock message was generated by the unlock service 26 (since the non-combustible aerosol provision system 10 can identify that the signed unlock message was generated using the private key 32) and that the signed unlock message was not tampered with 'in-flight' between the unlock service 26 and the non-combustible aerosol provision system 10 since the value of the signature/the encrypted form of the message is linked to the content of the message itself. Where the signed unlock message includes the signed hash digest, this provides further end-to-end assurance that the challenge message was also not tampered with "in flight" between the non-combustible aerosol provision system 10 and the unlock service 26.

In particular, this approach makes it very difficult for a user to unlock the aerosol provision system without successfully completing the age verification process from which the indication was received that enabled the generation of the signed unlock message at the unlock service 26. As such, this approach effectively reduces the chance that any person wishing to circumvent the age verification process can successfully access the aerosol provision system.

In response to successful authentication of the signed unlock message (YES output from S2-37), the non-combustible aerosol provision system 10 is unlocked at S2-41. Unlocking the system may comprise allowing the system to be used by a user to generate aerosols. For example, processing circuitry on the non-combustible aerosol provision system may prevent the operation of an aerosol generator of the system whilst the aerosol provision system is a locked state.

Conversely, the non-combustible aerosol provision system may be responsive to unsuccessful authentication of the signed unlock message (NO output from S2-37) to prevent unlocking of the aerosol provision system (S2-39). For example, if the aerosol provision system detects that the signed unlock message has been tampered with or was not generated by the unlock service 26, to prevent access by a user who has not successfully verified their age, the aerosol provision system may keep the non-combustible aerosol provision system 10 locked.

In some examples, the non-combustible aerosol provision system 10 notifies the user device 18 after unlocking. Similarly, the non-combustible aerosol provision system 10 may notify the user device 18 in the event of an unsuccessful authentication (S2-43). The user device 18 may therefore receive notification indicative of whether the authentication was successful and may for example, display a corresponding indication for a user at the user device.

It will be appreciated that there are a range of possible cryptographic operations and forms of private and public keys that could be used in accordance with the techniques described herein. For example, the unlock service and aerosol provision system may make use of the Digital Signature Algorithm (DSA) or the Rivest-Shamir-Adleman (RSA) cryptosystem for generating and authenticating the signed unlock message. In one example, the Elliptic Curve Digital Signature Algorithm (ECDSA) is used and the cryptographic operations performed and cryptographic keys used are in accordance with the techniques defined in ECDSA.

Thus there has been described a method to maintain a non-combustible aerosol provision system in a locked state which locked state is only removed (and an unlocked state adopted) upon request and in dependence upon the outcome of an age verification test for the user of the non-combustible aerosol provision system. The method is secured by use of asymmetric key cryptography to provide that only a device associated with a user for whom age verification has been successfully completed can be transitioned from the locked state to the unlocked state.

In accordance with the approaches described above in relation to FIGS. 1 and 2, the unlock service stores the private key of the key pair with the non-combustible aerosol provision system storing the public key. Since the public key can be publicly disseminated without compromising the security of the cryptography, the non-combustible aerosol provision system does not store a secret and so the risk of an aerosol provision system being compromised is reduced. In addition, this may simplify the manufacture and provisioning of the cryptographic key to the aerosol provision device since tamper resistant storage to store a private key securely does not need to be provided.

As described above, the present example provides that, the signed unlock message is cryptographically associated with the challenge response message, thereby allowing the non-combustible aerosol provision system to authenticate that the signed unlock message corresponds to the challenge response message previously generated by the non-combustible aerosol provision system. Such an approach can be beneficial in protecting against replay attacks in which a validly generated signed unlock message is used with a non-combustible aerosol provision system for which it was not intended, at a later time than was intended, or otherwise outside the scope for which the message was generated by the unlock service. By associating the signed unlock message with the challenge response message, the non-combustible aerosol provision device in such examples may be able to detect where a valid signed unlock message is used outside of the scope for which it was intended, and consequently prevent unlocking of the non-combustible aerosol provision system.

As described above the use of the challenge response message provides that upon verification of the later signed unlock message the non-combustible aerosol provision system is able to verify not only that the signed unlock message originated from the unlock service and was not tampered with during transmission to the aerosol provision system but also that the signed unlock message corresponds to the challenge response message generated by the system. As such, if a user were to attempt to unlock the aerosol provision system using a signed unlock message validly generated by the unlock service for a different aerosol provision system which had issued a different challenge response message, the aerosol provision system would not successfully authenticate the signed unlock message and so could prevent the non-combustible aerosol provision system being unlocked.

In another alternative to the above-described examples, the unlock service may combine (e.g., concatenates or interleaves) an unsigned unlock message and the challenge response message, hashes the combination of both messages and performs the cryptographic operation using the private key on the hash of both messages to generate a cryptographic signature to include in the signed unlock message.

This association could then be authenticated by carrying out a similar process at the non-combustible aerosol provision system to combine the challenge response message that was previously generated on the non-combustible aerosol provision system with an unsigned unlock message included in the signed unlock message and hash the result, undo, using the public key, the cryptographic operation performed on the signature and comparing with the hash. If a match is detected in the comparison, the signed unlock message and its cryptographic association with the challenge response message will be deemed valid.

Although the above description relates to unlocking of a single non-combustible aerosol provision system, the same approach and infrastructure can be used to control the lock state of multiple different non-combustible aerosol provision systems. In some such examples, the same key pair is used for a plurality (or all) aerosol provision systems managed by the unlock service. This may simplify the manufacturing process of the non-combustible aerosol provision system by removing the need to supply different cryptographic keys to different aerosol provision systems. However, to avoid a valid signed unlock message for one non-combustible aerosol provision system being used for another non-combustible aerosol provision system (for example in the event that two non-combustible aerosol provision systems happened to issue the same challenge), and to reduce the impact on further non-combustible aerosol provision systems if one is compromised, the unlock service may have access to a plurality of private keys corresponding to different aerosol provision systems. Approaches for provisioning a key to an non-combustible aerosol provision system is described below with reference to FIGS. 5-8.

In such a case, so that the unlock service 26 can identify the private key 32 to be used to generate the signed unlock message for a non-combustible particular aerosol provision system 10, the user device 18 includes a device identifier (e.g., a serial number) for the non-combustible aerosol provision system 10 in the unlock request. The unlock service 26 can then generate the signed unlock message using the private key 32 for that non-combustible aerosol provision system by selecting the private key 32 from the plurality of private keys accessible to the unlock service in the key store 28 (or in multiple such key stores). The unlock service 26 then generates the signed unlock message using the selected private key 32. Since the private key 32 selected by the unlock service 26 corresponds to the public key 14 stored at the non-combustible aerosol provision system 10 having that device identifier, use of the correct private key 32 will lead to successful authentication at the aerosol provision system, whereas use of the private key for a different non-combustible aerosol provision system can be detected by the non-combustible aerosol provision system and unlocking will not occur. As such, a signed unlock message validly generated for one non-combustible aerosol provision system cannot be re-used to unlock a different aerosol provision system.

In relation to the messaging between the user device 18 and the non-combustible aerosol provision system, as mentioned above the local communication channel 16 may use a suitable personal area network connectivity for transport. Further communication efficiency may be achieved over the local communication channel 16 by creating a modified profile corresponding to the use of the age verification approaches. Thus the messaging may be carried over the local communication channel in a low-overhead manner as message headers/wrappers may be minimized where the profile itself carries the relevant information.

In the example of a BLE protocol being used for this local communication channel, the following profile definitions could be used to achieve such communication efficiency.

- For the sending unlock request message from the user device 18 to the non-combustible aerosol provision system 10 (S2-5) the profile may describe a message coding that describes that the app (user device) is writing a request for a challenge, e.g. App Write Request Challenge, which may be coded for example as [0x00].
- For sending the challenge response from the non-combustible aerosol provision system 10 to the user device 18 (S2-13) the profile may describe a message coding that describes that the non-combustible aerosol provision system is notifying a challenge to the user device, e.g. Device Notify Challenge, which may be coded for example as [0x01][Challenge].
- For sending the signed unlock message from the user device 18 to the non-combustible aerosol provision system 10 (S2-31) the profile may describe a message that describes that the app (user device) is writing a signed request, e.g. App Write Request Signed, which may be encoded for example as [0x02][Signed Data].
- For sending a notification that the unlock was or was not successful from the non-combustible aerosol provision system 10 to the user device 18 (S2-43), the profile may describe a message that describes that the non-combustible aerosol provision system is writing an unlock success status, e.g. Device Notify Unlock Success, which may be encoded for example as [0x03][0x00 True ||0x01 False].

In the specific example where the challenge and signed unlock message are base 64 encoded, this will be the format used for the [Challenge] and [Signed Data] payloads indicated above.

Thus, there has been described a first approach to unlocking a non-combustible aerosol provision system in which public key cryptography is used. A second approach to unlocking the non-combustible aerosol provision system in which symmetric cryptography is used will now be described.

Thus a second set of examples in which symmetric key cryptography is implemented to unlock a non-combustible aerosol provision system are illustrated with reference to FIGS. 3, 4A and 4B. A schematic infrastructure for these examples is shown in FIG. 3.

Figure 3:
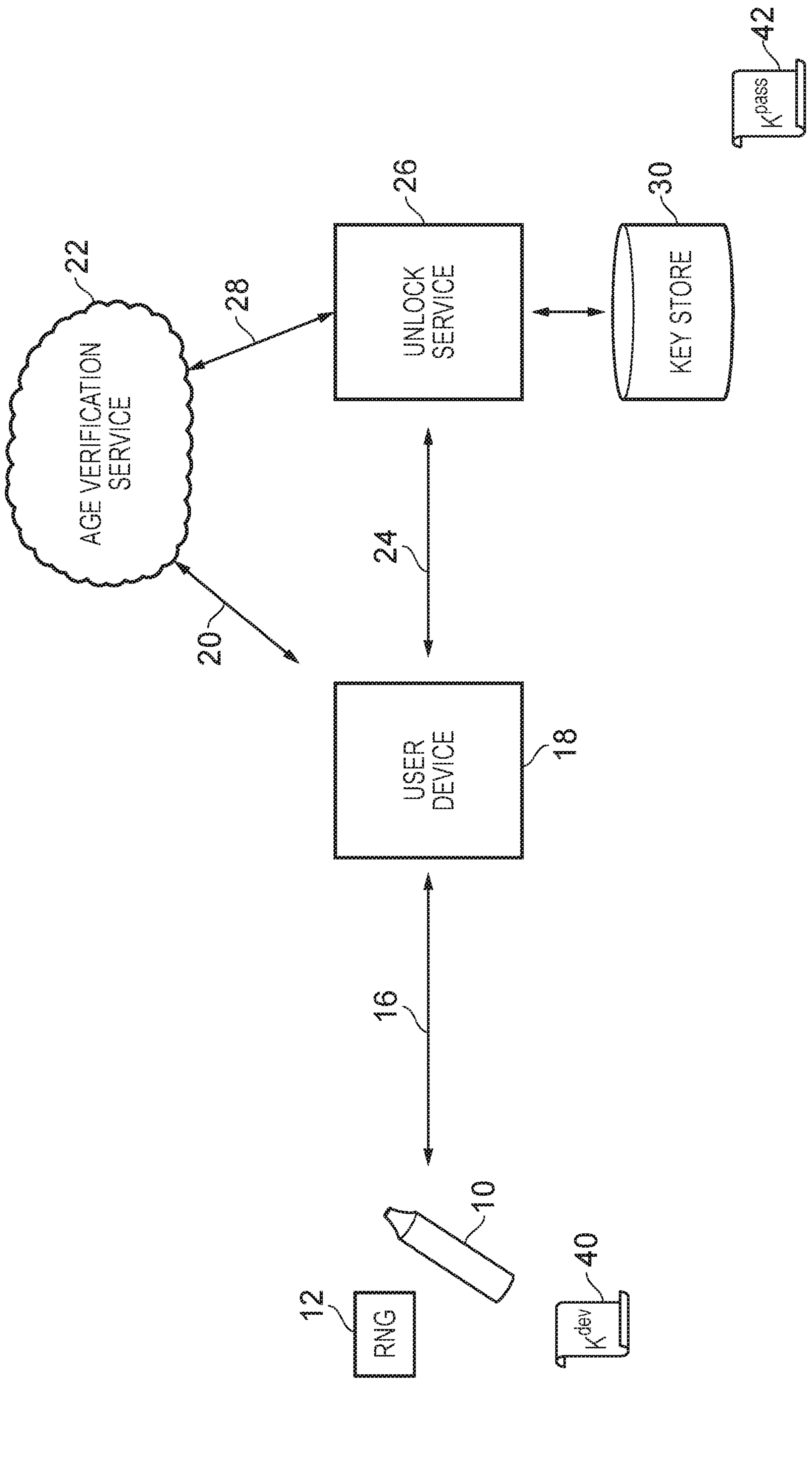
FIG. 3 is a schematic illustrating an example in which symmetric key cryptography is implemented to unlock a non-combustible aerosol provision system.
Figure 4A:
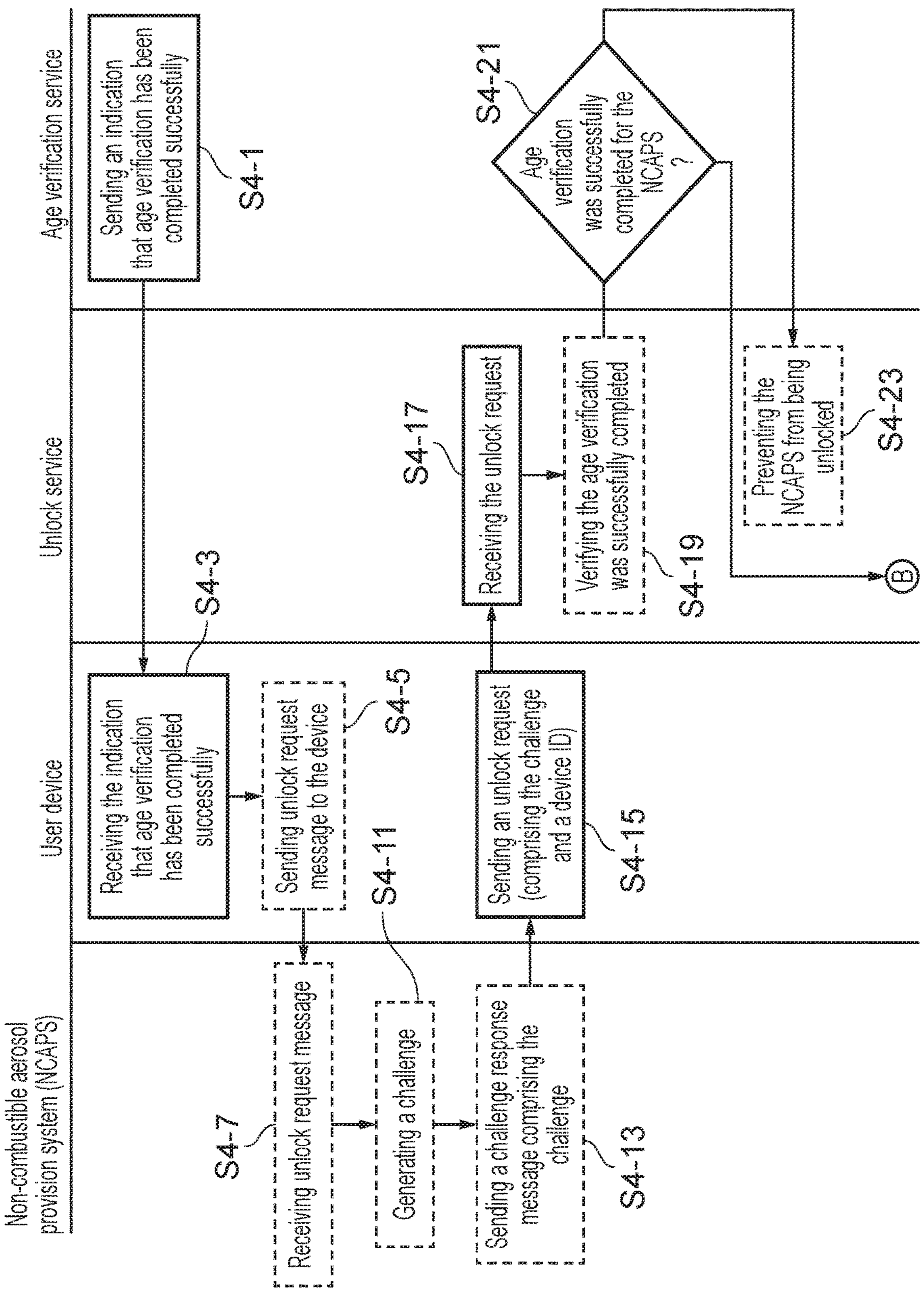
FIGS. 4A-4B are a flow diagram illustrating a method for unlocking a non-combustible aerosol provision system using symmetric key cryptography.
Figure 4B:
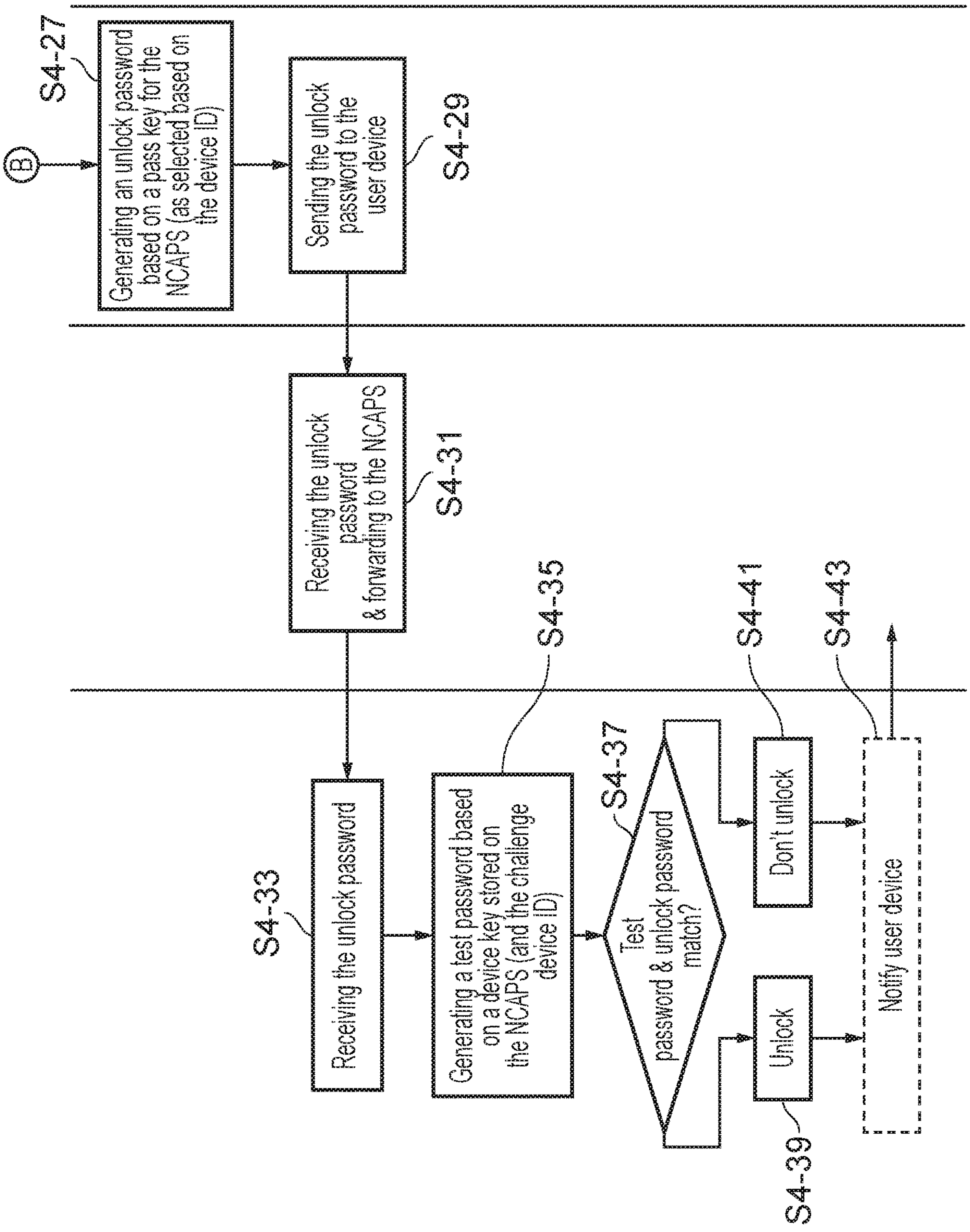

The infrastructure illustrated in FIG. 3 is similar to that already discussed above with reference to FIG. 1, and like reference numbers are used to denote like elements. Description of similar features will not be repeated.

As noted above, in the present examples, symmetric cryptography is used to secure the communication between the unlock service 26 and the non-combustible aerosol provision system 10. To facilitate this, the non-combustible aerosol provision system 10 of this example stores a device key 40 and the key store 30 stores a matching pass key 42. The device key 40 and the pass key 42 therefore represent a shared secret that may be applied at either side of a communication path to secure the transmission of messages therebetween.

Thus, in accordance with the techniques described herein, symmetric cryptography (also known as secret key cryptography) is used so that only the unlock service is able to unlock the aerosol provision system. With symmetric cryptography, a shared secret in the form of a cryptographic key known to both parties but secret to others is used to secure the transmission of information. As such, the unlock service is able to use the secret key to perform a cryptographic operation on some data to encrypt that data in a manner that cannot easily be reversed without knowledge of the secret key. The non-combustible aerosol provision system also storing a copy of the secret key can then reverse the cryptographic operation. In addition, as will become apparent, it is not necessary to perform a cryptographic operation using the shared secret, and rather each can be used as an input to a calculation at the unlock service that generates a message that can be transmitted to the non-combustible aerosol provision system and then verified by repeating the calculation at the non-combustible aerosol provision system.

In this present approaches, the unlock service stores a copy of the secret key referred to as the pass key with the aerosol provision system storing a copy of the secret key referred to as the device key. The non-combustible aerosol provision system may therefore comprise secure storage configured to securely store the device key such that it would be difficult to access the device key even to someone in possession of the aerosol provision system. The secure storage may comprise tamper resistant hardware and may for example comprise a Trusted Platform Module (TPM).

Accordingly, the unlock service 26 of the present example stores an association between the non-combustible aerosol provision system 10 and the pass key 42. The unlock service 26 may also store the received age verification result in association with the non-combustible aerosol provision system 10 and the pass key 42. The unlock service 26 may also or alternatively store an identifier corresponding to the user and/or the user device (or an instance of an app on the user device) in association with the pass key 42.

Thus there has been described an overview of an infrastructure that provides for a non-combustible aerosol provision system in a locked state to be securely unlocked upon request and in dependence upon the outcome of an age verification test for the user of the non-combustible aerosol provision system.

The method of unlocking a non-combustible aerosol provision system using symmetric key cryptography executed by the infrastructure illustrated with reference to FIG. 3 will now be discussed with respect to FIGS. 4A-4B. In this example, all operations shown in FIGS. 4A-4B are employed. However, the boxes with dashed lines in FIGS. 4A-4B indicate some operations that may be omitted from the method in other examples.

As with the approaches discussed above with reference to FIGS. 2A and 2B, the process may be triggered in one of a number of ways. Reference is therefore made to the examples given previously.

Irrespective of how the age verification process was triggered, as illustrated at S4-1, once the age verification process has been successfully completed, the age verification service 22 sends an indication that the age verification process was successfully completed in much the same way as described above with respect to S2-1.

Accordingly, at S4-3 the remote user device 18 receives an indication from the age verification service that the process has been successfully completed in much the same way as described above with respect to S2-3.

In response to the indication that age verification was completed, the user device will then produce or procure an unlock request for sending to the unlock service. In the present example, the unlock request is produced directly at the user device by the user device using a serial number or other specific identifier of the non-combustible aerosol provision system 10. Generally, in the present teachings, any mention of a serial number of the non-combustible aerosol provision system includes an actual serial number a portion of a serial number, a combination of a product number and a serial number or any other specific or unique identifier of the non-combustible aerosol provision system. Such an identifying number may also be termed a device identifier. In this way, the unlock request can be easily generated at the user device without the need for either complicated processing circuitry or burden upon the non-combustible aerosol provision system. Further, since the device identifier will likely be unique to the aerosol provision system, it is known that the challenge response message is unlikely to be the same as a challenge response message generated by another aerosol provision device.

As illustrated, the unlock request in the present approaches may optionally be procured by S4-5, S4-7, S4-11 and S4-13 in much the same way as S2-7, S2-9, S2-11 and S2-13 already described above. Reference is therefore again made to the approaches discussed above and the manner in which such approaches can supplementally provide protection against replay attacks.

In some examples, either the serial number of the non-combustible aerosol provision system 10 or the optional challenge may be considered as being a cryptographic nonce (or number-used-once) for the purposes of the symmetric-encryption based age verification-dependent unlocking approach.

Regardless of how the unlock request is determined, the unlock request is then sent by the user device 18 to the unlock service 26 at S4-15. This unlock request message is then received by the unlock service 26 at S4-17.

Thereafter in much the same manner as described above with respect to FIG. 2A, the unlock service then verifies that the age verification has been successfully completed for the user whose non-combustible aerosol provision system 10 is the subject of the unlock request. As before this may include querying the age verification service (illustrated at S4-19, S4-21 and S4-23), matching against a verification result already received from the age verification service and/or using an assertion of age verification being completed received in or associated with the unlock request.

Assuming that the age verification is determined to have been successfully completed, the approach continues at S4-27 where an unlock password is generated. This unlock password is based on the pass key 42.

In the present example, where the unlock request comprises a serial number of the non-combustible aerosol provision system 10, the unlock password is created by applying the pass key 42 to that a serial number of the non-combustible aerosol provision system 10. Although it would be possible to create the password by directly signing and/or encrypting the using a serial number of the non-combustible aerosol provision system 10, the present example uses an approach that is aimed at both minimizing the size of data to be transmitted and minimizing the cryptographic operations to be performed at the non-combustible aerosol provision system 10.

Thus in the present example, the password is generated by creating a string combination from the pass key and the serial number of the non-combustible aerosol provision system 10. These may be simply concatenated, or the two data may be interleaved in some fashion. Once the string combination has been created, the string combination is hashed to produce a hash digest. The hash may be computed using any suitable hash algorithm such as a Secure Hash Algorithm. The present example uses an SHA-2 algorithm to provide an appropriate balance between security and processing effort required of the non-combustible aerosol provision system, although other algorithms can be used. One specific illustrative example uses the SHA256 variant of SHA-2 to generate the hash digest.

To further minimize the volume of data which needs to be transmitting in messaging, the present approach then applies a string selection rule to output the unlock password. In some examples the digest may be re-expressed in Base64 for ease of copying either before or after the string selection rule is applied. The string selection rule (which is optional—the hash digest may be used as the unlock password in some examples) selects a subset of the values from the hash digest, using a predefined rule known to both the unlock service 26 and the non-combustible aerosol provision system. In one illustrative example the unlock passcode comprises the values taken from value positions in the hash digest corresponding to the first 8 numbers in the Fibonacci sequence. In other examples a different string selection rule could be used.

In examples in which the unlock request includes a challenge generated at the non-combustible aerosol provision system 10, the string combination is based upon a combination (such as a concatenation or interleaving) of the pass key 42 and the challenge response (and optionally also the serial number of the non-combustible aerosol provision system 10). In other examples in which the unlock request includes a challenge generated at the non-combustible aerosol provision system 10 the unlock password is generated by signing and/or encrypting the challenge using the pass key 42. In examples where the pass key is used to generate the unlock password by directly signing data, additional techniques to protect the pass key may be used.

Having generated the signed unlock message at S4-27, the unlock service 26 sends the unlock password to the user device 18 at S4-29. In turn, the user device 18 receives the unlock password and forwards the unlock password to the non-combustible aerosol provision system 10 at S4-31.

In response to receiving (at S4-33) the unlock password forwarded by the user device 18, the aerosol provision system generates at S2-35 a test password. The test password is generated using the same approach as was used to generate the unlock password, with the inputs being the device key 40 and, in the present example, a serial number of the non-combustible aerosol provision system 10 already known to the non-combustible aerosol provision system 10. In other examples where the non-combustible aerosol provision system 10 has already created a challenge that challenge is used as an input for the test key generation.

Accordingly, it will be understood that if the test password is generated from the same inputs as the unlock password, then they will be identical. Accordingly, as long as the device key 40 and pass key 42 are identical, and as long as the other inputs (i.e. in the present example the serial number of the non-combustible aerosol provision system 10, and in other examples optionally including or being a challenge), then the passwords will match, indicating that the unlock should be permitted.

Accordingly, at S4-37 the unlock password and the test password are compared to determine whether they match. A match in the comparison indicates that the unlock password is valid and is a strong indication that the unlock password was generated by the unlock service 26 in response to the unlock request from the user device 18. As such, an unlock password validly generated for one aerosol provision system cannot be re-used to unlock a different aerosol provision system.

Successful verification by the non-combustible aerosol provision system 10 therefore provides a strong indication both that the unlock password was generated by the unlock service 26 (since the non-combustible aerosol provision system 10 can identify that the unlock password was generated using the pass key 42) and that the unlock password was not tampered with 'in-flight' between the unlock service 26 and the non-combustible aerosol provision system 10 since the password will not match the test password if the content has been altered. Where the unlock password and test password are additionally based upon the challenge, this provides further end-to-end assurance that the challenge message was also not tampered with "in flight" between the non-combustible aerosol provision system 10 and the unlock service 26.

In particular, this approach makes it very difficult for a user to unlock the aerosol provision system without successfully completing the age verification process from which the indication was received that enabled the generation of the unlock password at the unlock service 26. As such, this approach effectively reduces the chance that any person wishing to circumvent the age verification process can successfully access the aerosol provision system.

In response to successful authentication of the signed unlock message (YES output from S4-37), the non-combustible aerosol provision system 10 is unlocked at S4-41. Unlocking the system may comprise allowing the system to be used by a user to generate aerosols. For example, processing circuitry on the non-combustible aerosol provision system may prevent the operation of an aerosol generator of the system whilst the aerosol provision system is a locked state.

Conversely, the non-combustible aerosol provision system may be responsive to unsuccessful authentication of the signed unlock message (NO output from S4-37) to prevent unlocking of the aerosol provision system (S4-39). For example, if the aerosol provision system detects that the signed unlock message has been tampered with or was not generated by the unlock service 26, to prevent access by a user who has not successfully verified their age, the aerosol provision system may keep the non-combustible aerosol provision system 10 locked.

In some examples, the non-combustible aerosol provision system 10 notifies the user device 18 after unlocking. Similarly, the non-combustible aerosol provision system 10 may notify the user device 18 in the event of an unsuccessful authentication (S4-43). The user device 18 may therefore receive notification indicative of whether the authentication was successful and may for example, display a corresponding indication for a user at the user device.

The techniques involved in generating and authenticating an unlock password are typically less computationally expensive than corresponding techniques in public-key cryptography. As such, the use of symmetric cryptography in this way may provide a fast way of securely unlocking a non-combustible aerosol provision system and may allow non-combustible aerosol provision systems with only limited processing capability to carry out the required operations to authenticate the unlock password.

It will be appreciated that there are a range of possible cryptographic operations and forms of cryptographic key that could be used in accordance with the techniques described herein. For example, the unlock service and aerosol provision system may make use of the Advanced Encryption Standard (AES) or a ChaCha cipher for generating and authenticating the unlock password.

In some examples, the same secret key is used for a plurality (or all) aerosol provision systems managed by the unlock service. This may simplify the manufacturing process of the non-combustible aerosol provision system by removing the need to supply different device keys to different aerosol provision systems. However, to avoid a valid unlock password for one aerosol provision system being used for another aerosol provision system, and to reduce the impact on further aerosol provision systems if one is compromised, each non-combustible aerosol provision system may be provided with a different device and the unlock service may have access to a plurality of pass keys for the aerosol provision systems. In this example, the key store 32 stores pass keys for a number of aerosol provision systems and so the pass key 64 for the particular aerosol provision system 10 being unlocked is selected based on the device identifier of for the aerosol provision system 10 received from the user device 18 in the unlock request.

In examples making use of the challenge from the non-combustible aerosol provision device in the unlock request additional protection can be provided against replay attacks in which a validly generated unlock password signed unlock message is used with an aerosol provision system for which it was not intended, at a later time than was intended, or otherwise outside the scope for which the message was generated by the unlock service. By associating the unlock password signed unlock message with the challenge response message, the aerosol provision device in such examples may be able to detect where a valid unlock password signed unlock message is used outside of the scope for which it was intended, and consequently prevent unlocking of the aerosol provision system.

In this way, the non-combustible aerosol provision system when using a challenge-based approach is able to verify not only that the unlock password originated from the unlock service and was not tampered with during transmission to the aerosol provision system but also that the unlock password corresponds to the challenge response message generated by the system. As such, if a user were to attempt to unlock the aerosol provision system using an unlock password validly generated by the unlock service for a different aerosol provision system which had issued a different challenge response message, the aerosol provision system would not successfully authenticate the unlock password and so could prevent the non-combustible aerosol provision system being unlocked.

Where a challenge approach is used for the unlock request, in general a more complex challenge response message may be used to increase the likelihood that the challenge response message will be unique to the aerosol provision device generating the message, the time at which the aerosol provision device generates the message, or both. This reduces the likelihood that another given unlock password will be associated with a matching challenge response message and so, if re-used, would lead to the aerosol provision device erroneously authenticating the signed unlock message.

On the other hand, by providing a challenge response message that can be easily generated by the aerosol provision system, the aerosol provision system may be able to generate the challenge response message more quickly and without the need for more complicated processing circuitry, such as dedicated hardware for generating random numbers or maintaining a synchronized clock.

Thus there has been described a method to maintain a non-combustible aerosol provision system in a locked state which locked state is only removed (and an unlocked state adopted) upon request and in dependence upon the outcome of an age verification test for the user of the non-combustible aerosol provision system. The method is secured by use of a symmetric cryptographic key (or other shared secret) approach to provide that only a device associated with a user for whom age verification has been successfully completed can be transitioned from the locked state to the unlocked state.

In relation to the messaging between the user device 18 and the non-combustible aerosol provision system, as mentioned above the local communication channel 16 may use a suitable personal area network connectivity for transport. Further communication efficiency may be achieved over the local communication channel 16 by creating a modified profile corresponding to the use of the age verification approaches. Thus the messaging may be carried over the local communication channel in a low-overhead manner as message headers/wrappers may be minimized where the profile itself carries the relevant information.

In the example of a BLE protocol being used for this local communication channel, the following profile definitions could be used to achieve such communication efficiency.

For the sending of the unlock password the user device 18 to the non-combustible aerosol provision system 10 (S4-31) the profile may describe a message coding that describes that the app (user device) is writing a password, e.g. App Write Passkey, which may be coded for example as [0x00][PassKey].

For sending a notification that the unlock was or was not successful from the non-combustible aerosol provision system 10 to the user device 18 (S4-43), the profile may describe a message that describes that the non-combustible aerosol provision system is writing an unlock success status, e.g. Device Notify Unlock Success, which may be encoded for example as [0x03][0x00 True||0x01 False].

In an example where a challenge is used, profile messaging corresponding to that illustrated with respect to the asymmetric encryption approach above may be used. In the specific example where the challenge and signed unlock message are base 64 encoded, this will be the format used for the [PassKey] payload indicated above.

Whether asymmetric or symmetric cryptography is used, as described above, unlocking of the non-combustible aerosol provision system makes use of a cryptographic key stored on the non-combustible aerosol provision system. Whether or not all non-combustible aerosol provision systems are provided with the same key (e.g., where each non-combustible aerosol provision system has a unique key), this key may be provided during the manufacturing process or a post-manufacture, but pre-sales configuration of the non-combustible aerosol provision system. The following example is discussed in the context of examples in which a different key is provisioned to each non-combustible aerosol provision system.

Figure 5:
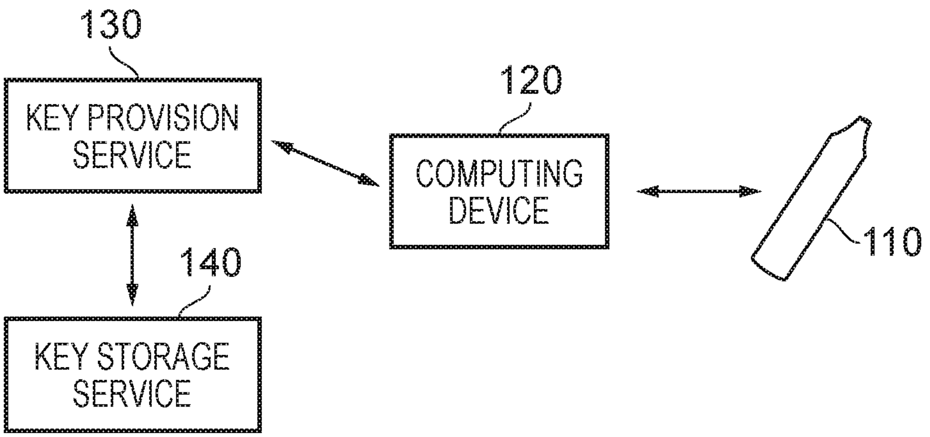
FIG. 5 is a schematic illustrating an example in which a computing device in communication with a key provision service can provision a cryptographic key to a non-combustible aerosol provision system.

FIG. 5 is a schematic illustrating a first example key provisioning approach in which a computing device 50 in communication with a key provision service 54 via connection 56 can provision a cryptographic key to a non-combustible aerosol provision system 10 via a connection 52. In this example, the non-combustible aerosol provision system 10 is provided with a cryptographic key by the computing device 50 while the computing device 50 is in communication with the key provision service 54 via connection 56. In some examples, this involves writing the cryptographic key to tamper-resistant storage on the non-combustible aerosol provision system, such as tamper-resistant storage in a Trusted Platform Module (TPM).

As further shown in FIG. 5, the key provision service 54 is also in communication with a key storage service 58 via a connection 60. It will be appreciated that in this example and that of FIGS. 6-8, the cryptographic key provisioned to the non-combustible aerosol provision system 10 may be either of a public key of an asymmetric key pair or a secret key for use with symmetric cryptography.

As the non-combustible aerosol provision system 10 may have restricted connectivity capabilities, the connection 52 of the present example is a wireless channel provided using a connectivity technology such as a personal area network protocol. Example personal area network protocols include Bluetooth™, Bluetooth Low Energy™ (BLE), Zigbee™, Wireless USB, and Near-Field Communication (NFC). Example personal area network protocols also include protocols making use of optical communication such as Infrared Data association (IrDA) and data-over-sound. The remainder of this discussion will use the example of BLE and will use BLE terminology, although it will be appreciated that corresponding or equivalent functionalities of other personal area network technologies may be substituted. Other wireless technologies such as a Wi-Fi™ technology may be used if the non-combustible aerosol provision system has suitable capability. In other examples, the connection 52 may be a wired communication channel provided between physical ports of the non-combustible aerosol provision system 10 and the user device 18. Such a wired communication channel may utilize a physical connection technology such as USB™, a serial port, FireWire™ or other point-to-point wired connectivity.

The connections 56 and 60 interconnecting the computing device 50, key provision service 54 and key storage service 60 are, in the present example all network connections. Thus each of these connections may include one or more of local area network, wide area network and internet connectivities, which may be provided over wireless and/or wired network infrastructure. To provide that the keys and other associated data are securely exchanged without opportunity for fraudulent intervention by a malicious party, the network connections may be secured by a technique such as SSL, tunnelling, encryption, signed messaging or the like. In other examples, either or both of these connections may be a direct wired connection such as a serial (e.g. USB™, Firewire™, serial port) or parallel connection. Indeed, in some examples, any two or more of the computing device 50, key provision service 54 and key storage service 60 may be separate functionalities of a single computing system.

The connections 52, 56 and 60 may be impermanent or otherwise transient in the sense that the connection may be established for a period of time necessary to carry out specific functionalities, but may also be disconnected when not required.

By arranging for the computing device 50 to be communication with the key provision service 54 when the key is written to the non-combustible aerosol provision system 10, the computing device 50 can receive the cryptographic key to be used as it is needed. This reduces the need for the computing device 50 to either generate its own cryptographic keys or store a selection of pre-generated keys. In addition an association between the key written to any given non-combustible aerosol provision system 10 and an identifier (such as a device identifier) for that non-combustible aerosol provision system can also be provided to the key storage service 58 in real time (or approximately real time), again reducing a need for local storage of the association information at the computing device 50.

Figure 6:
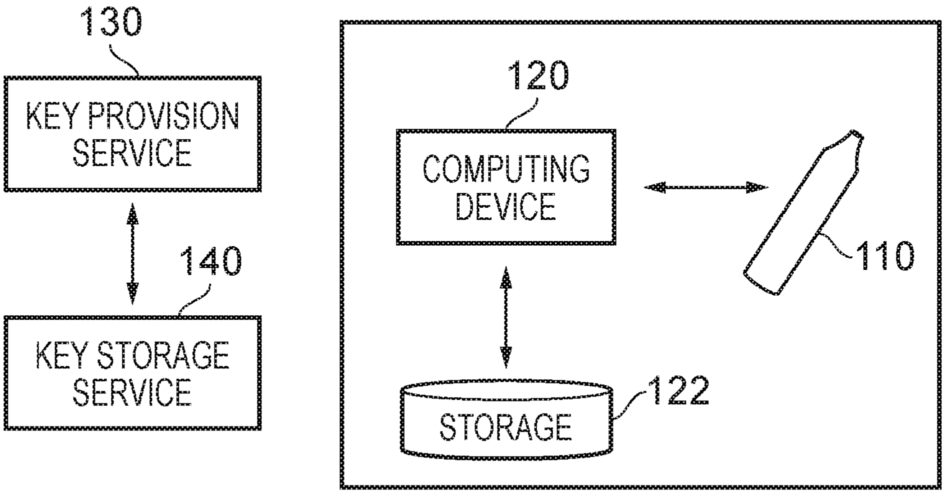
FIG. 6 is a schematic illustrating an example in which a computing device without data connectivity to a key provision service can provision a cryptographic key to a non-combustible aerosol provision system.

FIG. 6 is a schematic illustrating a second example approach in which a computing device can provision a cryptographic key to a non-combustible aerosol provision system. This approach is very similar to that illustrated in FIG. 5, except that the computing device 50 operates "off-line" with respect to the key provision service and key storage service (as illustrated by outline 66). Thus, in this example, the computing device 50 operates without data connectivity to the key provision service 54. This may be done to ensure the security of the cryptographic keys, since the secrecy of these keys forms the basis of the integrity of communication with the non-combustible aerosol provision system 10. The computing device 50 therefore provisions a cryptographic key to a non-combustible aerosol system, using a key already available to the computing device. In some examples, this involves writing the cryptographic key to tamper-resistant storage on the non-combustible aerosol provision system, such as tamper-resistant storage in a Trusted Platform Module (TPM).

In this example, the computing device 60 has access to storage 64 via a connection 54 on which storage pre-generated keys, previously generated by the key provision service 54 are stored and the association between allocated cryptographic keys and the device identifier of the non-combustible aerosol provision system to which they are allocated may be stored. To transfer the unallocated keys to the computing device 50 and transfer the associations between allocated keys and device identifiers between the computing device 50 to the key storage service 58, the storage 60 may be physically removed and securely transferred to and from the computing device 50. Thus the connection 64 of the present example is a secure direct connection between the computing device 50 and the storage 62. This secure direct connection may include any of directly attaching the storage to a data bus of the computing device 50 (such as via an eSATA™ port), directly attaching the storage to a data port of the computing device 50 (such as a USB™ or FireWire™ port), or attaching the storage to a local area network of the computing device (such as in the form of a NAS or SAN volume) and securing the connection over the local area network. Other connectivity approaches (such as a wireless data connection) may be adopted as may be deemed appropriately secure in any particular implementation.

In other examples, connectivity between the computing device 50 and the ley provision service 54 may be intermittently activated to enable provisioning of more keys to the storage 62 and/or recording of key/device ID associations from the storage 62 in a batch or burst manner. This approach may be used for example in order to provide enhanced security by avoiding keeping connection 56 open for long periods of time, and/or to facilitate providing the computing device with keys and receiving association information in return while the computing device 50 has been physically removed from a non-combustible aerosol provisioning device facility or location to a location deemed more secure for data connection. Thus the computing system may be "returned to base" relative to the key provision service for key/association transfers before and after use to provision keys to non-combustible aerosol provisioning devices.

Thus in the approach illustrated of each of FIGS. 5 and 6 the computing device 50 when it is to provision a non-combustible aerosol provision system with a cryptographic key receives a device identifier for the non-combustible aerosol provision system to which a key is to be provided. The device identifier (e.g., a serial number or other suitable identifier) may be received from the non-combustible aerosol provision system itself or may be received from another device involved in the manufacturing process, for example, a second computing device that allocates and stores the device identifiers.

The computing device to provision the aerosol provision system with a cryptographic key obtains the particular cryptographic key to provision to the non-combustible aerosol provision system based on one or more cryptographic keys provided by a key provision service. The key provision service itself provides a secure means for generating unique keys and providing them to the computing device to provision to the aerosol provision systems. The cryptographic keys provided by the key provision service may for example be generated in accordance with standard techniques for generating unique keys. The cryptographic keys received from the key provision service may be for be a device key in the form of a secret key for use with symmetric cryptography or a public key of a public-private key pair to be used in public key cryptography. As indicated with respect to the discussion of FIGS. 5 and 6 above, the providing of the keys to the computing device may be over a live connection to the key provision service or by way of an offline provisioning enabling the keys to be stored (cached) at the computing system.

So that the cryptographic key for the aerosol provision system can later be determined from the device identifier (e.g., for use in unlocking the non-combustible aerosol provision system), the computing device causes the device identifier and the particular cryptographic key to be stored in association with one another. By consulting this stored association between the device identifier and the particular cryptographic key, the particular cryptographic key to use can later be determined based on the device identifier. As indicated with respect to the discussion of FIGS. 5 and 6 above, the providing of the association to the key storage service may be over a live connection between the key provision service and the computing device or by way of an offline provisioning enabling the associations to be stored (cached) at the computing system.

Thus there have been described example infrastructures for both off-line and online provisioning of cryptographic keys to a non-combustible aerosol provision device to permit the non-combustible aerosol provision device to later use the cryptographic key to provide enhanced certainty to an age verification process to unlock the non-combustible aerosol provision device.

Example methods for provisioning keys according to these two example architectures are now described with reference to FIGS. 7 and 8.

Figure 7:
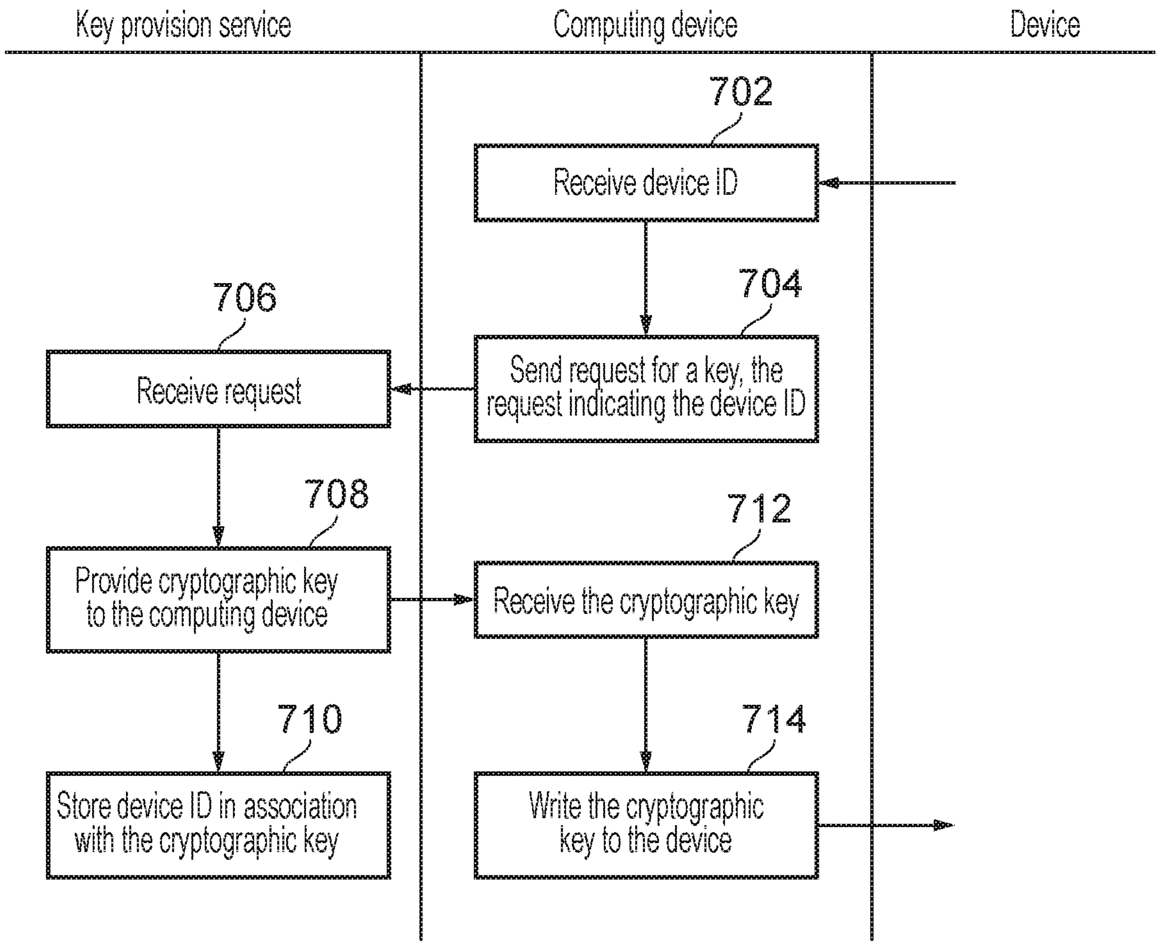
FIG. 7 is flow diagram illustrating a method for provisioning a non-combustible aerosol provision system with a cryptographic key using a computing device in communication with a key provision service.

FIG. 7 is flow diagram illustrating a method for provisioning a non-combustible aerosol provision system 10 with a cryptographic key using a computing device 50 in communication with a key provision service 54.

At S7-1, the computing device 50 receives a device identifier for the non-combustible aerosol provision system 10. Although in the present example the device identifier is received from the non-combustible aerosol provision system 10 itself, in other examples the device identifier may be received from another computing device involved in the process of preparing the non-combustible aerosol provision system 10.

In response to receiving the device identifier, the computing device 50 sends at S7-3 a request for a new cryptographic key to the key provision service 54. The request indicates the device identifier for the non-combustible aerosol provision system 10 to which a key is to be provisioned.

The key provision service 54 receives this request at S7-5. In response to the request, the key provision service 54 provides (S7-7) a cryptographic key to the computing device 50 for allocation to the non-combustible aerosol provision system 10. The cryptographic key may be generated by any suitable means by the key provision service 54 or the key provision service 54 may have itself received the cryptographic from a separate key generation service or retrieve a pre-generated key from the key storage service.

In response to receiving the cryptographic key from the key provision service 54 at S7-9, the computing device 50 writes the cryptographic key to the non-combustible aerosol provision system 10 at S7-11. The cryptographic key may for example be written to tamper-resistant storage of the non-combustible aerosol provision system so that once the key has been written, it cannot be modified. In this way, the non-combustible aerosol provision system 10 can be permanently assigned a cryptographic key.

At S7-13, the key provision service 54 also stores the device identifier for the non-combustible aerosol provision system in association with the cryptographic key at the key storage service 58. In this way, sending the request by the computing device 50 causes the device identifier to be stored in association with the cryptographic key.

Thus there has been described any example method for online provisioning of cryptographic keys to a non-combustible aerosol provision device to permit the non-combustible aerosol provision device to later use the cryptographic key to provide enhanced certainty to an age verification process to unlock the non-combustible aerosol provision device.

Figure 8:
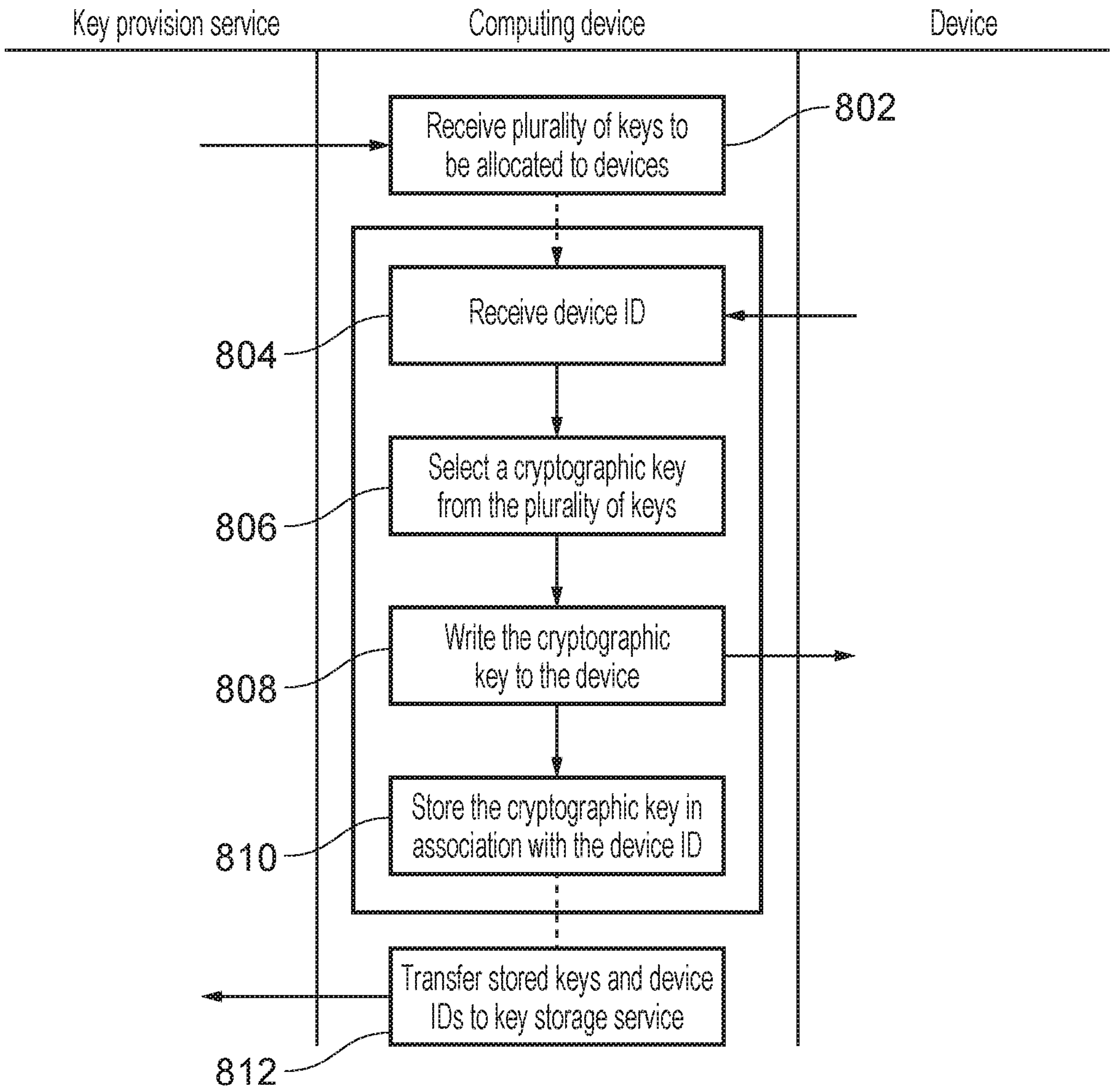
FIG. 8 is a flow diagram illustrating a method for provisioning a non-combustible aerosol provision system with a cryptographic key using a computing device without data connectivity to a key provision service.

FIG. 8 is a flow diagram illustrating a method for provisioning a non-combustible aerosol provision system 10 with a cryptographic key using an offline computing device 50 operating without data connectivity to the key provision service 54.

As shown in S8-1, secure storage 62 accessible to the computing device 50 may initially be provisioned with a plurality of cryptographic keys from the key provision service 54. However, following this transfer of keys, there is no connectivity between the offline computing device 50 and the key provision service 54 at a time of provisioning the keys to non-combustible aerosol provision devices.

Therefore, to provision a cryptographic key to the non-combustible aerosol provision system 10, the computing device 50 first receives a device identifier for the non-combustible aerosol provision system 110 at S8-3, whereupon the computing device selects a cryptographic key from amongst the unallocated cryptographic keys stored on the storage 62 (S8-5). This key can then be written at S8-7 to the non-combustible aerosol provision system in accordance with any suitable approach, and may be written such that the key on the device cannot be modified once it has been written.

The computing device 50 then stores the cryptographic key written to the non-combustible aerosol provision system 10 in association with the device identifier for the non-combustible aerosol provision system 10 at S8-9. Thus, in this example, the computing device 50 causes the association between the cryptographic key and the device identifier to be stored by storing the association in the secure storage 62.

S8-3 to S8-9 may be repeated several times using the plurality of cryptographic keys supplied in S8-1 without the need for communication between the computing device 50 and the key provision service 54. Once all of the cryptographic keys supplied to the computing device 50 have been allocated or it is otherwise desired to transfer the stored keys and device identifiers to the key storage service 54, a data transfer may be conducted as described above. In the present example, the storage 62 is removed from the computing device 50 and physically transferred to the key storage service 54. In other examples the computing device may be physically removed to a key/association transfer location and/or a data connection between computing device and key provision service may be temporarily established.

In this way, the non-combustible aerosol provision system 10 can be provided with a cryptographic key in a secure manner, reducing the risk that the key could be compromised in the process of writing the key.

Thus there has been described any example method for off-line provisioning of cryptographic keys to a non-combustible aerosol provision device to permit the non-combustible aerosol provision device to later use the cryptographic key to provide enhanced certainty to an age verification process to unlock the non-combustible aerosol provision device.

A key stored in the key storage service 58 by either of the methods discussed with reference to FIGS. 7 and 8 may subsequently be made available to unlock service 26 described above with respect to the various approaches for performing unlocking using age verification and cryptographic certainty described with reference to FIGS. 1-4 above. In some examples the key storage service 58 may be the same as the key store 30, and in other examples the key storage service 58 may make keys and associations available to be held at the key store 30.

In some examples a non-combustible aerosol provision system 10 may be subjected to writing of a new cryptographic key to replace or supplement and already-written key. To achieve this, the same as illustrated with respect to FIG. 7 or 8 may be used, although this may not be during manufacture/before sale but rather after some use. Such an approach may be performed if a specific key or keys (such as a symmetric key or private key of an asymmetric key pair) were otherwise compromised, in order to re-establish the cryptographic certainty being employed with an age verification approach. Alternatively there may be a requirement to transfer the non-combustible aerosol provision device from a symmetric to asymmetric encryption approach (or vice-versa). In such examples the software or firmware of the non-combustible electronic provision system may also be updated to reflect the revised approach to securing an age verification method.

In examples where the same key is provisioned to multiple non-combustible aerosol provision systems, the above-taught approaches are still applicable but the number of devices to which each key is provisioned is increased and the key associations are updated accordingly. If every non-combustible aerosol provision system is provided with the same key, then the keeping of key associate data is optional.

It will be appreciated that the present approaches involves transmission of data to and from a non-combustible aerosol provision system, and for the non-combustible aerosol provision system to process stored and/or received data. Also, some of the present approaches require a user device to be capable of communicating with a non-combustible aerosol provision system and with other services or systems. Therefore, to illustrate suitable devices for providing such functionalities, an example non-combustible aerosol provision system 10 and an example user device 16 are illustrated with respect to FIGS. 9 and 10 respectively.

Figure 9:
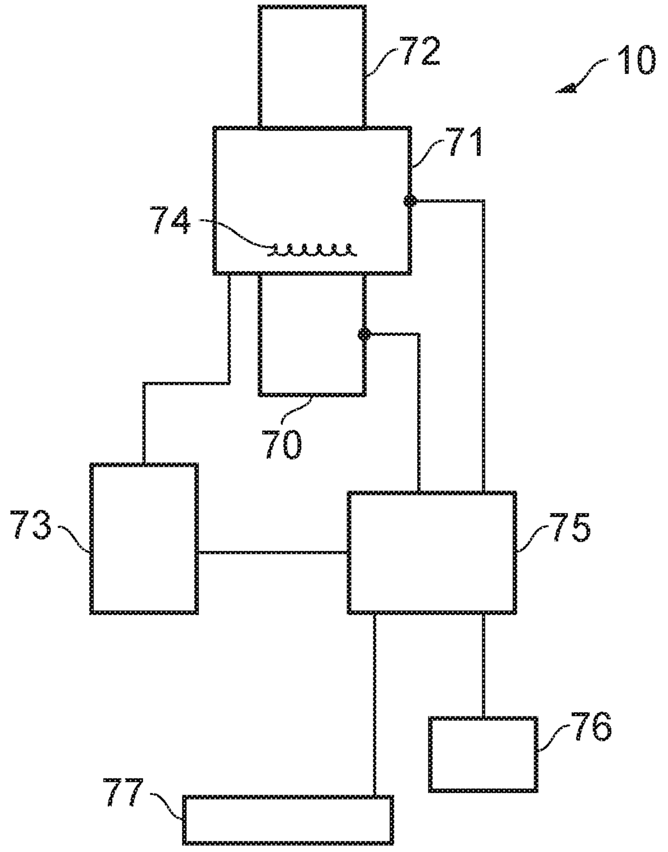
FIG. 9 is a schematic illustrating an example of a non-combustible aerosol provision system.

An example of an non-combustible aerosol provision system 10 is schematically illustrated in FIG. 9. As shown, the aerosol delivery device 10 is a device which contains elements relating to aerosol generation such as an aerosol medium container or cartridge 70 (in the case of an END device, the aerosol medium container or cartridge 70 will contain nicotine or a nicotine-bearing formulation), an aerosol generation chamber 71 and an outlet 72 through which a generated aerosol may be discharged. A battery 73 may be provided which to power a thermal generator element (such as a heater coil 74) within the aerosol generation chamber 71. The battery 73 may also power a processor/controller 75 which may serve purposes of device usage, such as activation of the device for aerosol generation in response to an activation trigger, and purposes of communication and functionality control. Processor/controller 75 may have access to a memory 76 in which a cryptographic key may be stored. Memory 76 may therefore be or include a secure storage such as a trusted platform module. The memory 76 may be internal to the processor/controller or may be provided as an addition separate physical element. To perform transmission and reception of data and/or messaging, the processor/controller is provided with a transmitter/receiver element 77. In the present example, this is a BLE interface element including a radio antenna for wireless communication. As mentioned above, in other examples this may be an interface element for an alternative personal area network technology and/or a wired connection interface.

The processor/controller 75 may in one example be an STM32 microcontroller as provided by ST Microelectronics and based on the ARM™ Cortex™-M processor. In other examples an alternative microcontroller or processor may be used, which may be based upon an ARM™ architecture, and Atom™ architecture or other low power processor technology. Alternatively or additionally, the transmitter/receiver element 77 may in one example include an nRF BLE chip for cooperating with the processor/controller to provide BLE connectivity to the non-combustible aerosol provision system. In other examples, other communication interface chips or modules may be deployed to provide connectivity services.

As illustrated, processor 75 may be connected for example to aerosol medium container or cartridge 70, aerosol generation chamber 71 and battery 73. This connection may be to an interface connection or output from ones of the components and/or may be to a sensor located at or in ones of the components. These connections may provide access by the processor to properties of the respective components. For example a battery connection may be used to control whether the non-combustible aerosol provision system can be activated for aerosol generation in accordance with a lock/unlock state recorded in the processor 75 or memory 77.

The processor/controller 75 can also be capable of generating a random number, using a random number generator of the non-combustible aerosol provision system, a random number generator of the processor/controller and/or a software/firmware routine for random number generation. The processor/controller 75 can also be capable for generating a challenge (such as corresponding to S2-11 or S4-11) in response to receiving a challenge request via the transmitter/receiver element 77. Such a challenge may include a random number and/or a data sequence stored in the memory 77, and such a challenge can be provided responsive to receipt of a challenge request.

The processor/controller 75 can also be capable of carrying out a cryptographic or other calculation corresponding to the confirmation of age verification (such as by authenticating a signed unlock message corresponding to S2-35 or generating a test password corresponding to S4-35). The processor/controller 75 may also be capable of controlling the non-combustible aerosol provision system 10 into one of a lock state (in which an aerosol generation activation is not permitted) and an unlock state (in which an aerosol generation activation is permitted). Such control between lock and unlock states may be dependent upon the outcome of an age verification process such as described above with reference to FIGS. 2 and 4.

The processor/controller 75 and/or the memory 77 may be capable of receiving a write of a cryptographic key such as may be provided by a key provisioning method as described above with reference to FIGS. 7 and 8.

The various mentioned capabilities of the processor/controller 75 may be provided by software stored in the memory 77 and/or by firmware instruction written to the processor/controller 75.

Thus the non-combustible aerosol provision system 10 of the present examples can operate in accordance with any or all of the infrastructures and/or methods described above with reference to any of FIGS. 1 to 8.

Figure 10:
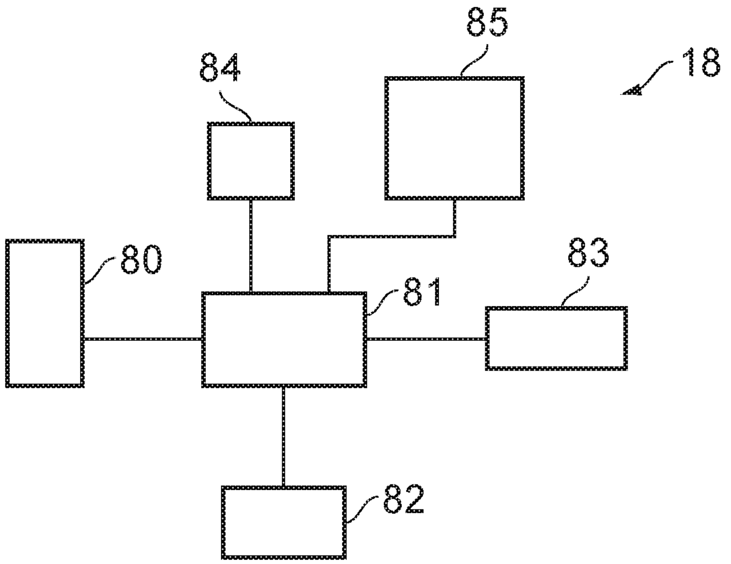
FIG. 10 is a schematic illustrating an example of a user device.

An example of a user device 18 is schematically illustrated in FIG. 10. As mentioned above, the user device may be a device such as a mobile telephone or tablet. The user device may also be a device such as a portable computer, laptop computer or netbook. As shown, the user device 18 includes a receiver transmitter element 80 for communicating with a non-combustible aerosol provision system 10. Thus the receiver transmitter element 80 will be configured to use the same connectivity and protocols, etc., as the non-combustible aerosol provision system with which it is to interact in any given implementation.

The receiver transmitter element 80 is connected to a processor or controller 81 which can receive and process the data or messaging received from the non-combustible aerosol provision system. The processor or controller 81 has access to a memory 82 which can be used to store program information and/or data. The user device 18 may include a further data transmission interface 83. This interface may provide one or more interface functionalities, for example to a wired connection such as wired local area network and/or to a wireless connection such as wireless local area network and/or cellular data services. This interface may be used for example for sending and receipt of messaging to and from the unlock service 22 and/or the unlock service 26. The user device 18 may also include user interface elements such as an output device 84 (which may include one or more of a display, an audio output, and a haptic output) and/or an input device 85 (which may include one or more of buttons, keys, touch-sensitive display elements, or a mouse/trackpad).

The user device 18 may be pre-programmed or configured to provide the functionalities discussed with reference to infrastructures illustrated in FIGS. 1 and 3 and/or the methods illustrated in FIGS. 2 and 4. Additionally or alternatively, the user device may store software (e.g. in memory 82) such as an app to cause the processor or controller 81 to have those functionalities when the software is executed. Thus the user device may be a multi-purpose device that has the described functionalities when the app is executed.

As has been indicated above, the techniques described herein may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media such as carrier signals and transmission media. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media. Transient communication media may occur between components of a single computing system (e.g. on an internal link or bus between e.g. a memory and processor) or between separate computing systems (e.g. over a network or other inter-computing device connection), and may include transmission signals, carrier waves or the like.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilized and modifications may be made without departing from the scope of the claims. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

Accordingly, the disclosure includes the following clauses:

1. A method for unlocking a non-combustible aerosol provision system, the method comprising:
   - receiving, from an age verification service, an indication that an age verification process has been successfully completed;
   - sending an unlock request for the non-combustible aerosol provision system to an unlock service;
   - receiving, a signed unlock message from the unlock service, the signed unlock message cryptographically signed using a private key associated with a corresponding public key at the non-combustible aerosol provision system; and
   - forwarding the signed unlock message to the non-combustible aerosol provision system for authentication of the signed unlock message using the public key at the non-combustible aerosol provision system.
2. The method according to clause 1, the method further comprising:
   - in response to receiving the indication from the age verification service, sending a challenge request message to the non-combustible aerosol provision system; and receiving, from the non-combustible aerosol provision system, a challenge response message;

wherein sending the unlock request to the unlock service comprises sending an unlock request comprising the challenge response message; and the signed unlock message received from the unlock service provides a cryptographic association between the private key and the challenge response message that can be authenticated by the non-combustible aerosol provision system using the public key.

3. The method according to clause 2, wherein:

the challenge response message is based on random number selected by the non-combustible aerosol provision system.

4. The method according to any preceding clause, wherein:

the unlock request sent to the unlock service comprises a device identifier for the non-combustible aerosol provision system; and the signed unlock message received from the unlock service is signed using a private key for the non-combustible aerosol provision system selected based on the device identifier from a plurality of private keys accessible to the remote server.

5. The method according to any preceding clause, wherein:

the signed unlock request received from the unlock service is indicative that the unlock service has received an indication that the age verification process was successfully completed.

6. The method according to any preceding clause, wherein:

unlocking the non-combustible aerosol provision system comprises allowing the non-combustible aerosol provision system to be used to generate aerosols for delivery to a user.

7. The method according to any preceding clause, wherein:

a user device carrying out the method communicates with the unlock service via a programmatic interface.

8. The method according to any preceding clause, wherein:

the unlock service is provisioned at a remote server.

9. A device for unlocking a non-combustible aerosol provision system, the device comprising processing circuitry configured to:

receive, from an age verification service, an indication that an age verification process has been successfully completed;

send an unlock request for the non-combustible aerosol provision system to an unlock service;

receive a signed unlock message from the unlock service, the signed unlock message cryptographically signed using a private key associated with a corresponding public key at the non-combustible aerosol provision system; and forward the signed unlock message to the non-combustible aerosol provision system for authentication of the signed unlock message using the public key at the non-combustible aerosol provision system.

10. The device according to clause 9, wherein the processing circuitry is further configured to:

send, in response to receiving the indication from the age verification service, a challenge request message to the non-combustible aerosol provision system; and receive, from the non-combustible aerosol provision system, a challenge response message;

wherein to send the unlock request to the unlock service, the processing circuitry is configured to send an unlock request comprising the challenge response message; and the signed unlock message received from the unlock service provides a cryptographic association between the private key and the challenge response message that can be authenticated by the non-combustible aerosol provision system using the public key.

11. The device according to clause 10, wherein:

the challenge response message is based on random number selected by the non-combustible aerosol provision system.

12. The device according to any of clauses 9 to 11, wherein:

the unlock request sent to the unlock service comprises a device identifier for the non-combustible aerosol provision system; and the signed unlock message received from the unlock service is signed using a private key for the non-combustible aerosol provision system selected based on the device identifier from a plurality of private keys accessible to the remote server.

13. The device according to any of clauses 9 to 12, wherein:

the signed unlock request received from the unlock service is indicative that the unlock service has received an indication that the age verification process was successfully completed.

14. The device according to any of clauses 9 to 13, wherein:

unlocking the non-combustible aerosol provision system comprises allowing the non-combustible aerosol provision system to be used to generate aerosols for delivery to a user.

15. The device according to any of clauses 9 to 14, wherein:

the device is configured to communicate with the unlock service via a programmatic interface.

16. The device according to any of clauses 9 to 15, wherein:

the unlock service is provisioned at a remote server.

17. A computer-readable medium comprising instructions which, when executed by a computing device, cause the computing device to:

receive, from an age verification service, an indication that an age verification process has been successfully completed;

send an unlock request for the non-combustible aerosol provision system to an unlock service;

receive a signed unlock message from the unlock service, the signed unlock message cryptographically signed using a private key associated with a corresponding public key at the non-combustible aerosol provision system; and forward the signed unlock message to the non-combustible aerosol provision system for authentication of the signed unlock message using the public key at the non-combustible aerosol provision system.

18. The computer-readable medium according to clause 17, wherein the instructions, when executed by the computing device, further cause the computing device to:

send, in response to receiving the indication from the age verification service, a challenge request message to the non-combustible aerosol provision system; and receive, from the non-combustible aerosol provision system, a challenge response message;

wherein to send the unlock request to the unlock service, the computing device is to send an unlock request comprising the challenge response message; and the signed unlock message received from the unlock service provides a cryptographic association between the private key and the challenge response message that can be authenticated by the non-combustible aerosol provision system using the public key.

19. The computer-readable medium according to clause 18, wherein:

the challenge response message is based on random number selected by the non-combustible aerosol provision system.

20. The computer-readable medium according to any of clauses 17 to 19, wherein:

the unlock request sent to the unlock service comprises a device identifier for the non-combustible aerosol provision system; and the signed unlock message received from the unlock service is signed using a private key for the non-combustible aerosol provision system selected based on the device identifier from a plurality of private keys accessible to the remote server.

21. The computer-readable medium according to any of clauses 17 to 20, wherein:

the signed unlock request received from the unlock service is indicative that the unlock service has received an indication that the age verification process was successfully completed.

22. The computer-readable medium according to any of clauses 17 to 21, wherein:

unlocking the non-combustible aerosol provision system comprises allowing the non-combustible aerosol provision system to be used to generate aerosols for delivery to a user.

23. The computer-readable medium according to any of clauses 17 to 22, wherein:

the computing device communicates with the unlock service via a programmatic interface.

24. The computer-readable medium according to any of clauses 17 to 23, wherein:

the unlock service is provisioned at a remote server.

25. A method for unlocking a non-combustible aerosol provision system, the method comprising:

receiving at the non-combustible aerosol provision system, a signed unlock message from a user device, the signed unlock message cryptographically signed using a private key;

authenticating, at the non-combustible aerosol provision system, the signed unlock message using a public key at the non-combustible aerosol provision system to determine whether the private key used to sign the signed unlock message corresponds to the public key at the non-combustible aerosol provision system; and in response to successfully authenticating the signed unlock message, unlocking the non-combustible aerosol provision system.

26. The method according to clause 25, the method further comprising:

receiving, from the user device, a challenge request message;

generating a challenge response message; and sending, to the user device, the challenge response message;

wherein the signed unlock message provides a cryptographic association between a given challenge response message and the private key; and authenticating the signed unlock message further comprises determining whether the challenge response message generated by the non-combustible aerosol provision system matches the given challenge response message.

27. The method according to clause 26, wherein:

generating the challenge response message comprises selecting a random number and generating the challenge response message in dependence on the selected random number.

28. A non-combustible aerosol provision system comprising processing circuitry configured to:

receive a signed unlock message from a user device, the signed unlock message cryptographically signed using a private key;

authenticate the signed unlock message using a public key stored on the non-combustible aerosol provision system to determine whether the private key used to sign the signed unlock message corresponds to the public key; and unlock, in response to successfully authenticating the signed unlock message, the non-combustible aerosol provision system.

29. The non-combustible aerosol provision system according to clause 28, the processing circuitry further configured to:

receive, from the user device, a challenge request message;

generate a challenge response message; and send, to the user device, the challenge response message;

wherein the signed unlock message provides a cryptographic association between a given challenge response message and the private key; and to authenticate the signed unlock message, the processing circuitry is further configured to determine whether the challenge response message generated by the non-combustible aerosol provision system matches the given challenge response message.

30. The non-combustible aerosol provision system according to clause 29, wherein:

to generate the challenge response message, the processing circuitry is configured to select a random number and generate the challenge response message in dependence on the selected random number.

31. A computer-readable medium comprising instructions which, when executed by processing circuitry of a non-combustible aerosol provision system, cause the non-combustible aerosol provision system to:

receive a signed unlock message from a user device, the signed unlock message cryptographically signed using a private key;

authenticate the signed unlock message using a public key stored on the non-combustible aerosol provision system to determine whether the private key used to sign the signed unlock message corresponds to the public key; and unlock, in response to successfully authenticating the signed unlock message, the non-combustible aerosol provision system.

32. The computer-readable medium according to clause 31, wherein the instructions, when executed by the processing circuitry, further cause the non-combustible aerosol provision system to:

receive, from the user device, a challenge request message;

generate a challenge response message; and send, to the user device, the challenge response message;

wherein the signed unlock message provides a cryptographic association between a given challenge response message and the private key; and authenticating the signed unlock message, the non-combustible aerosol provision system is further to determine whether the challenge response message generated by the non-combustible aerosol provision system matches the given challenge response message.

33. The computer-readable medium according to clause 32, wherein:

to generate the challenge response message, the non-combustible aerosol provision system is to select a random number and generate the challenge response message in dependence on the selected random number.

34. A method for unlocking a non-combustible aerosol provision system, the method comprising:

receiving, by a user device, an indication from an age verification service that an age verification process has been successfully completed for the non-combustible aerosol provision system;

sending, by the user device, an unlock request for the non-combustible aerosol provision system to an unlock service;

generating, by the unlock service, a signed unlock message, the signed unlock message cryptographically signed using a private key associated with a corresponding public key at the non-combustible aerosol provision system;

sending, by the unlock service to the remote device, the signed unlock message;

forwarding, by the user device to the non-combustible aerosol provision system, the signed unlock message;

authenticating, at the non-combustible aerosol provision system, the signed unlock message using the public key at the non-combustible aerosol provision system to determine whether the private key used to sign the signed unlock message corresponds to the public key at the non-combustible aerosol provision system;

in response to successfully authenticating the signed unlock message, unlocking the non-combustible aerosol provision system.

35. The method according to clause 34, the method further comprising:

in response to receiving the indication from the age verification service, sending, by the user device a challenge request message to the non-combustible aerosol provision system;

generating, by the non-combustible aerosol provision system, a challenge response message; and sending, by the non-combustible aerosol provision system to the user device, the challenge response message;

wherein sending the unlock request to the unlock service comprises sending an unlock request comprising the challenge response message;

generating the signed unlock message by the unlock service comprises providing a cryptographic association between the private key and a given challenge response message; and authenticating the signed unlock message by the non-combustible aerosol provision system further comprises determining whether the challenge response message generated by the non-combustible aerosol provision system matches the given challenge response message.

36. The method according to clause 34 or clause 35, wherein:

the unlock request sent to the unlock service comprises a device identifier for the non-combustible aerosol provision system; and generating the signed unlock message by the unlock service comprises selecting the private key from a plurality of private keys accessible to the unlock service based on the device identifier and signing the signed unlock message using the selected private key.

37. The method according to any of clauses 34 to 36, the method further comprising:

in response to the unlock request, verifying with the age verification process by the unlock service that the age verification process was successfully completed for the non-combustible aerosol provision system;

wherein generating the signed unlock request by the unlock service is responsive to successfully verifying that the age verification process was successfully completed.

38. A system comprising:

a non-combustible aerosol provision system;

a remote device; and an unlock service;

wherein:

the remote device is configured to receive from an age verification service, an indication that an age verification process has been successfully completed for the non-combustible aerosol provision system, and to send an unlock request for the non-combustible aerosol provision system to the unlock service;

the unlock service is configured to generate a signed unlock message, the signed unlock message cryptographically signed using a private key associated with a corresponding public key at the non-combustible aerosol provision system, and send the signed unlock message to the remote device;

the remote device is further configured to forward the signed unlock message to the non-combustible aerosol provision system; and the non-combustible aerosol provision system is configured to authenticate the signed unlock message using the public key at the non-combustible aerosol provision system to determine whether the private key used to sign the signed unlock message corresponds to the public key, and in response to successfully authenticating the signed unlock message, unlock the non-combustible aerosol provision system.

39. The system according to clause 38, wherein:
the user device is configured to send, in response to receiving the indication from the age verification service, a challenge request message to the non-combustible aerosol provision system;
the non-combustible aerosol provision system is configured to generate a challenge response message; and
the non-combustible aerosol provision system is configured to send to the user device, the challenge response message;
wherein to send the unlock request to the unlock service, the user device is configured to send an unlock request comprising the challenge response message;
to generate the signed unlock message, the unlock service is configured to provide a cryptographic association between the private key and a given challenge response message; and
authenticating the signed unlock message by the non-combustible aerosol provision system is further to determine whether the challenge response message generated by the non-combustible aerosol provision system matches the given challenge response message.

40. The system according clause 38 or clause 39, wherein:
the unlock request sent to the unlock service comprises a device identifier for the non-combustible aerosol provision system; and
to generate the signed unlock message, the unlock service is configured to select the private key from a plurality of private keys accessible to the unlock service based on the device identifier and sign the signed unlock message using the selected private key.

41. The system according to any of clauses 38 to 40, wherein:
the unlock service is configured to verify, in response to the unlock request, with the age verification process that the age verification process was successfully completed for the non-combustible aerosol provision system;
wherein the unlock service is responsive to successfully verifying that the age verification process was successfully completed, to generate the signed unlock request.

42. A computer-readable medium comprising instructions which, when executed by processing circuitry of a non-combustible aerosol provision system, a user device, and an unlock service, cause the processing circuitry to:
receive, by a user device, an indication from an age verification service that an age verification process has been successfully completed for the non-combustible aerosol provision system;
send, by the user device, an unlock request for the non-combustible aerosol provision system to an unlock service;
generate, by the unlock service, a signed unlock message, the signed unlock message cryptographically signed using a private key associated with a corresponding public key at the non-combustible aerosol provision system;
send, by the unlock service to the user device, the signed unlock message;
forward, by the user device to the non-combustible aerosol provision system, the signed unlock message;
authenticate, at the non-combustible aerosol provision system, the signed unlock message using the public key at the non-combustible aerosol provision system to determine whether the private key used to sign the signed unlock message corresponds to the public key at the non-combustible aerosol provision system;
in response to successfully authenticating the signed unlock message, unlock the non-combustible aerosol provision system.

43. The computer-readable medium according to clause 42, wherein the instructions further cause:
the user device to send, in response to receiving the indication from the age verification service, a challenge request message to the non-combustible aerosol provision system;
the non-combustible aerosol provision system to generate a challenge response message; and
the non-combustible aerosol provision system to send to the user device, the challenge response message;
wherein to send the unlock request to the unlock service, the user device is to send an unlock request comprising the challenge response message;
to generate the signed unlock message, the unlock service is to provide a cryptographic association between the private key and a given challenge response message; and
authenticating the signed unlock message by the non-combustible aerosol provision system is further to determine whether the challenge response message generated by the non-combustible aerosol provision system matches the given challenge response message.

44. The computer-readable medium according clause 42 or clause 43, wherein:
the unlock request sent to the unlock service comprises a device identifier for the non-combustible aerosol provision system; and
to generate the signed unlock message, the unlock service is to select the private key from a plurality of private keys accessible to the unlock service based on the device identifier and sign the signed unlock message using the selected private key.

45. The system according to any of clauses 42 to 44, wherein the instructions further cause:
the unlock service to verify, in response to the unlock request, with the age verification process that the age verification process was successfully completed for the non-combustible aerosol provision system; and
the unlock service to generate the signed unlock request responsive to successfully verifying that the age verification process was successfully completed.

46. A method for provisioning a non-combustible aerosol provision system with a cryptographic key, the method comprising:
receiving a device identifier for the non-combustible aerosol provision system;
obtaining a particular cryptographic key to provision to the non-combustible aerosol provision system based on one or more cryptographic keys provided by a key generation service;
causing the device identifier to be stored in association with the particular cryptographic key; and
writing the particular cryptographic key to the non-combustible aerosol provision system.

47. The method according to clause 46, wherein:
obtaining the particular cryptographic key to provision to the non-combustible aerosol provision system comprises:
sending a request to the key generation service, the request comprising the device identifier, and
receiving the particular key from the key provision service;
wherein sending the request to the key generation service causes the device identifier to be stored in association with the particular cryptographic key by the key provision service.
48. The method according to clause 46, wherein:
obtaining the particular cryptographic key to provision to the non-combustible aerosol provision system comprises selecting the particular cryptographic key from a plurality of cryptographic keys provided by the key provision service and stored at the offline device; and
causing the device identifier to be stored in association with the particular cryptographic key comprises storing the particular key in association with the device identifier for subsequent transfer to a key storage service.
49. The method according to clause 48, wherein:
the method is performed by a device operating without data connectivity to the key provision service.
50. The method according to any of clauses 46 to 49, wherein:
the particular cryptographic key is a private key of an asymmetric key pair.
51. The method according to clause 50, further comprising:
providing the public key of the asymmetric key pair to an unlock service to be stored in association with the device identifier.
52. A system for provisioning a non-combustible aerosol provision system with a cryptographic key, the system comprising:
the non-combustible aerosol provision system;
a computing device configured to:
receive a device identifier for the non-combustible aerosol provision system;
obtain a particular cryptographic key to provision to the non-combustible aerosol provision system based on one or more cryptographic keys provided by a key generation service;
cause the device identifier to be stored in association with the particular cryptographic key; and
write the particular cryptographic key to the non-combustible aerosol provision system.
53. The system according to clause 52, wherein the computing device is configured to:
obtain the particular cryptographic key to provision to the non-combustible aerosol provision system by:
sending a request to the key generation service, the request comprising the device identifier, and
receiving the particular key from the key provision service;
wherein sending the request to the key generation service causes the device identifier to be stored in association with the particular cryptographic key by the key provision service.
54. The system according to clause 52, wherein the computing device is configured to:
obtain the particular cryptographic key to provision to the non-combustible aerosol provision system by selecting the particular cryptographic key from a plurality of cryptographic keys provided by the key provision service and stored at the offline device; and
cause the device identifier to be stored in association with the particular cryptographic key by storing the particular key in association with the device identifier for subsequent transfer to a key storage service.
55. The system according to clause 54, wherein:
the computing device is configured to operate without data connectivity to the key provision service.
56. The system according to any of clauses 52 to 55, wherein:
the particular cryptographic key is a private key of an asymmetric key pair.
57. The system according to clause 56, wherein the computing device is further configured to:
provide the public key of the asymmetric key pair to an unlock service to be stored in association with the device identifier.
58. A computer-readable medium comprising instructions which, when executed by processing circuitry of a computing device, cause the computing device to:
receive a device identifier for a non-combustible aerosol provision system;
obtain a particular cryptographic key to provision to the non-combustible aerosol provision system based on one or more cryptographic keys provided by a key generation service;
cause the device identifier to be stored in association with the particular cryptographic key; and
write the particular cryptographic key to the non-combustible aerosol provision system.
59. The computer-readable medium according to clause 58, wherein the instructions, when executed by the processing circuitry, cause the computing device to:
obtain the particular cryptographic key to provision to the non-combustible aerosol provision system by:
sending a request to the key generation service, the request comprising the device identifier, and
receiving the particular key from the key provision service;
wherein sending the request to the key generation service causes the device identifier to be stored in association with the particular cryptographic key by the key provision service.
60. The computer-readable medium according to clause 58, wherein the instructions, when executed by the processing circuitry, cause the computing device to:
obtain the particular cryptographic key to provision to the non-combustible aerosol provision system by selecting the particular cryptographic key from a plurality of cryptographic keys provided by the key provision service and stored at the offline device; and
cause the device identifier to be stored in association with the particular cryptographic key by storing the particular key in association with the device identifier for subsequent transfer to a key storage service.
61. The computer-readable medium according to clause 60, wherein:
the computing device is configured to operate without data connectivity to the key provision service.
62. The computer-readable medium according to any of clauses 58 to 61, wherein:
the particular cryptographic key is a private key of an asymmetric key pair.

63. The computer-readable medium according to clause 62, wherein the instructions, when executed, further cause the computing device to:
 provide the public key of the asymmetric key pair to an unlock service to be stored in association with the device identifier.

The invention claimed is:

1. A method for unlocking a non-combustible aerosol provision system, the method comprising:
 receiving, from an age verification service, an indication that an age verification process has been successfully completed for the non-combustible aerosol provision system;
 sending an unlock request for the non-combustible aerosol provision system to an unlock service;
 receiving an unlock password from the unlock service, the unlock password based on a pass key accessible to the unlock service; and
 forwarding the unlock password to the non-combustible aerosol provision system for authentication of the unlock password to determine whether the pass key matches a device key at the non-combustible aerosol provision system.

2. The method according to claim 1, wherein:
 the unlock request comprises a device identifier for the non-combustible aerosol provision system; and
 the pass key is a particular pass key for the non-combustible aerosol provision system selected from a plurality of pass keys accessible to the unlock service based on the device identifier.

3. The method according to claim 1, the method further comprising:
 in response to receiving the indication from the age verification service, sending a challenge request message to the non-combustible aerosol provision system; and
 receiving, from the non-combustible aerosol provision system, a challenge response message;
 wherein sending the unlock request to the unlock service comprises sending an unlock request comprising the challenge response message; and
 the unlock password received from the unlock service provides a cryptographic association between the pass key and the challenge response message that can be authenticated by the non-combustible aerosol provision system.

4. The method according to claim 3, wherein:
 the challenge response message is based on a random number selected by the non-combustible aerosol provision system.

5. The method according to claim 1, wherein:
 the unlock password received from the unlock service is indicative that the unlock service has received an indication that the age verification process was successfully completed.

6. The method according to claim 1, wherein:
 unlocking the non-combustible aerosol provision system comprises allowing the non-combustible aerosol provision system to be used to generate aerosols for delivery to a user.

7. The method according to claim 1, wherein:
 a user device carrying out the method communicates with the unlock service via a programmatic interface.

8. The method according to claim 1, wherein:
 the unlock service is provisioned at a remote server.

9. A device for unlocking a non-combustible aerosol provision system, the device comprising processing circuitry configured to carry out the method of claim 1.

10. A non-transitory computer-readable storage medium comprising instructions which, when executed by a computing device, cause the computing device to carry out the method of claim 1.

11. A method for unlocking a non-combustible aerosol provision system, the method comprising:
 receiving, by a user device from an age verification service, an indication that an age verification process has been successfully completed for the non-combustible aerosol provision system;
 sending by the user device, an unlock request for the non-combustible aerosol provision system to an unlock service;
 generating, by the unlock service, an unlock password based on a pass key accessible to the unlock service;
 sending, by the unlock service to the user device, the unlock password;
 forwarding, by the user device to the non-combustible aerosol provision system, the unlock password;
 generating, by the non-combustible aerosol provision system, a test password based on a device key stored on the non-combustible aerosol provision system;
 comparing the test password and the unlock password to determine whether the device key matches the pass key on which the unlock password is based; and
 in response to detecting a match in the comparison, unlocking the non-combustible aerosol provision system.

12. The method according to claim 11, wherein:
 the unlock request sent to the unlock service comprises a device identifier for the non-combustible aerosol provision system; and
 generating the unlock password by the unlock service comprises selecting the particular pass key for the non-combustible aerosol provision system from a plurality of pass keys accessible to the unlock service based on the device identifier.

13. The method according to claim 11 the method further comprising:
 in response to receiving the indication from the age verification service, sending a challenge request message by the user device to the non-combustible aerosol provision system;
 generating, by the non-combustible aerosol provision system, a challenge response message;
 sending, by the non-combustible aerosol provision system to the user device, the challenge response message;
 wherein:
  sending the unlock request to the unlock service comprises sending an unlock request comprising the challenge response message;
  generating the unlock password by the unlock service comprises providing a cryptographic association between the pass key and a given challenge response message;
  generating the test password by the non-combustible aerosol provision system comprises generating the test password based on the challenge response message; and
  comparing the test password and the unlock password is further to determine whether the challenge response message generated by the non-combustible aerosol provision system matches the given challenge response message.

* * * * *